United States Patent
Xue et al.

(10) Patent No.: US 12,457,624 B2
(45) Date of Patent: Oct. 28, 2025

(54) STAND-ALONE SIDELINK FOR INDUSTRIAL INTERNET OF THING (IIOT)

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Ozcan Ozturk, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/918,794

(22) PCT Filed: Apr. 30, 2020

(86) PCT No.: PCT/CN2020/088060
§ 371 (c)(1),
(2) Date: Oct. 13, 2022

(87) PCT Pub. No.: WO2021/217557
PCT Pub. Date: Nov. 4, 2021

(65) Prior Publication Data
US 2023/0131862 A1    Apr. 27, 2023

(51) Int. Cl.
*H04W 72/25*    (2023.01)
*H04W 28/02*    (2009.01)
(Continued)

(52) U.S. Cl.
CPC ....... *H04W 72/25* (2023.01); *H04W 28/0273* (2013.01); *H04W 72/02* (2013.01); *H04W 76/14* (2018.02)

(58) Field of Classification Search
CPC ............. H04W 72/25; H04W 28/0273; H04W 72/02; H04W 48/16; H04W 72/20;
(Continued)

(56) References Cited

U.S. PATENT DOCUMENTS

2018/0183551 A1*   6/2018  Chou ................... H04L 5/001
2020/0008030 A1    1/2020  Kim et al.
(Continued)

FOREIGN PATENT DOCUMENTS

| | | |
|---|---|---|
| CN | 109640289 A | 4/2019 |
| CN | 110679190 A | 1/2020 |

(Continued)

OTHER PUBLICATIONS

Fan et al., "Communication Method and Communication Device", Apr. 4, 2019, WO, WO 2019063020 (Year: 2019).*
(Continued)

*Primary Examiner* — Michael K Phillips
(74) *Attorney, Agent, or Firm* — Harrity & Harrity LLP

(57) ABSTRACT

Wireless communications systems and methods related to stand-alone sidelink communication are provided. A first user equipment (UE) transmits a sidelink system information signal including an indication of a first preconfigured profile of a plurality of preconfigured profiles. The first UE communicates, with a second UE, a first sidelink transmission based at least in part on the first preconfigured profile.

30 Claims, 10 Drawing Sheets

(51) Int. Cl.
*H04W 72/02* (2009.01)
*H04W 76/14* (2018.01)

(58) Field of Classification Search
CPC ..... H04W 76/14; H04W 88/04; H04W 48/12; H04W 74/0808
See application file for complete search history.

(56) References Cited

U.S. PATENT DOCUMENTS

| | | | |
|---|---|---|---|
| 2020/0077380 A1 | 3/2020 | Hahn | |
| 2021/0105789 A1* | 4/2021 | Freda | H04W 72/56 |
| 2021/0329510 A1* | 10/2021 | Tseng | H04W 4/40 |
| 2022/0060929 A1* | 2/2022 | Hassan | H04W 28/0231 |
| 2022/0150730 A1* | 5/2022 | Freda | H04W 24/04 |
| 2022/0232575 A1* | 7/2022 | Lee | H04W 72/56 |
| 2023/0188964 A1* | 6/2023 | Pateromichelakis | H04L 67/34 709/218 |
| 2024/0389115 A1* | 11/2024 | Park | H04W 28/0278 |

FOREIGN PATENT DOCUMENTS

| | | | | |
|---|---|---|---|---|
| WO | 2019036578 | A1 | 2/2019 | |
| WO | WO-2019063020 | A1 * | 4/2019 | ......... H04J 11/0069 |
| WO | 2019160788 | A1 | 8/2019 | |
| WO | 2020034610 | A1 | 2/2020 | |

OTHER PUBLICATIONS

International Search Report and Written Opinion—PCT/CN2020/088060—ISA/EPO—Jan. 27, 2021.
Huawei (TR Editor): TR 37.985, "Overall Description of Radio Access Network (RAN) Aspects for Vehicle-to-everything (V2X) Based on LTE and NR", v1.1.0, R1-2001218, 3GPP TSG-RAN WG1 Meeting #100-e, 3rd Generation Partnership Project, Mobile Competence Centre, 650, Route Des Lucioles, F-06921 Sophia-Antipolis Cedex, France, Feb. 24-Mar. 6, 2020, Feb. 27, 2020, XP052344281, pp. 1-34, Paragraph [ 5.2.2.2.1] * * Paragraph [ 5.2 . 1] * * Paragraph [ 5.1.2.2].
Intel Corporation: "Sidelink Synchronization Design for NR V2X Communication", 3GPP TSG RAN WG1 Meeting #96bis, R1-1904297, 3rd Generation Partnership Project, Mobile Competence Centre, 650, Route Des Lucioles, F-06921 Sophia-Antipolis Cedex, France, vol. RAN WG1, No. Xi'an, China, Apr. 8-12, XP051707176, 2019, pp. 1-17, paragraph [ 2.2.3].
Oppo et al: "CR on Reduction of SIB21 Size", 36331_CR2950_(REL-14)_R2-1705854, 3GPP TSG-RAN WG2 Meeting #98, 3rd Generation Partnership Project, Mobile Competence Centre, 650, Route Des Lucioles, F-06921 Sophia-Antipolis Cedex France vol. RAN WG2, No. Hangzhou, China, May 15, 2017-May 19, 2017, Jun. 2, 2017, 23 Pages, XP051665835, Paragraph [ 6.3.1].
Supplementary European Search Report—EP20933633—Search Authority—Munich—Dec. 20, 2023.

* cited by examiner

STAND-ALONE SIDELINK FOR INDUSTRIAL INTERNET OF THING (IIOT)

CROSS-REFERENCE TO RELATED APPLICATIONS

The present application is a 35 U.S.C. 371 National Phase entry of Patent Cooperation Treaty (PCT) Application No. PCT/CN2020/088060, filed Apr. 30, 2020, which is hereby incorporated by reference in its entirety as if fully set forth below for all applicable purposes.

TECHNICAL FIELD

This application relates to wireless communication systems, and more particularly to stand-alone sidelink communication for industrial Internet of thing (IIoT) applications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum. Additionally, NR sidelink may be extended to support applications in other vertical domains, such as be IIoT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), includes transmitting a sidelink system information signal including an indication of a first preconfigured profile of a plurality of preconfigured profiles; and communicating, with a second UE, a first sidelink transmission based at least in part on the first preconfigured profile.

In an additional aspect of the disclosure, a method of wireless communication performed by a first user equipment (UE), includes receiving, from a second UE, a sidelink system information signal including an indication of a first preconfigured profile of a plurality of preconfigured profiles; and communicating a first sidelink transmission based at least in part on the first preconfigured profile.

In an additional aspect of the disclosure, a first user equipment (UE) includes a transceiver configured to transmit a sidelink system information signal including an indication of a first preconfigured profile of a plurality of preconfigured profiles; and communicate, with a second UE, a first sidelink transmission based at least in part on the first preconfigured profile.

In an additional aspect of the disclosure, a first user equipment (UE) includes a transceiver configured to receive, from a second UE, a sidelink system information signal including an indication of a first preconfigured profile of a plurality of preconfigured profiles; and communicate a first sidelink transmission based at least in part on the first preconfigured profile.

In an additional aspect of the disclosure, a non-transitory computer-readable medium having program code recorded thereon, the program code includes code for causing a first user equipment (UE) to transmit a sidelink system information signal including an indication of a first preconfigured profile of a plurality of preconfigured profiles; and code for causing the first UE to communicate, with a second UE, a first sidelink transmission based at least in part on the first preconfigured profile.

In an additional aspect of the disclosure, a non-transitory computer-readable medium having program code recorded thereon, the program code includes code for causing a first user equipment (UE) to receive, from a second UE, a sidelink system information signal including an indication of a first preconfigured profile of a plurality of preconfigured profiles; and code for causing the first UE to communicate a first sidelink transmission based at least in part on the first preconfigured profile.

In an additional aspect of the disclosure, a first user equipment (UE) includes means for transmitting a sidelink system information signal including an indication of a first preconfigured profile of a plurality of preconfigured profiles; and means for communicating, with a second UE, a first sidelink transmission based at least in part on the first preconfigured profile.

In an additional aspect of the disclosure, a first user equipment (UE) includes means for receiving, from a second UE, a sidelink system information signal including an indication of a first preconfigured profile of a plurality of preconfigured profiles; and means for communicating a first sidelink transmission based at least in part on the first preconfigured profile.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
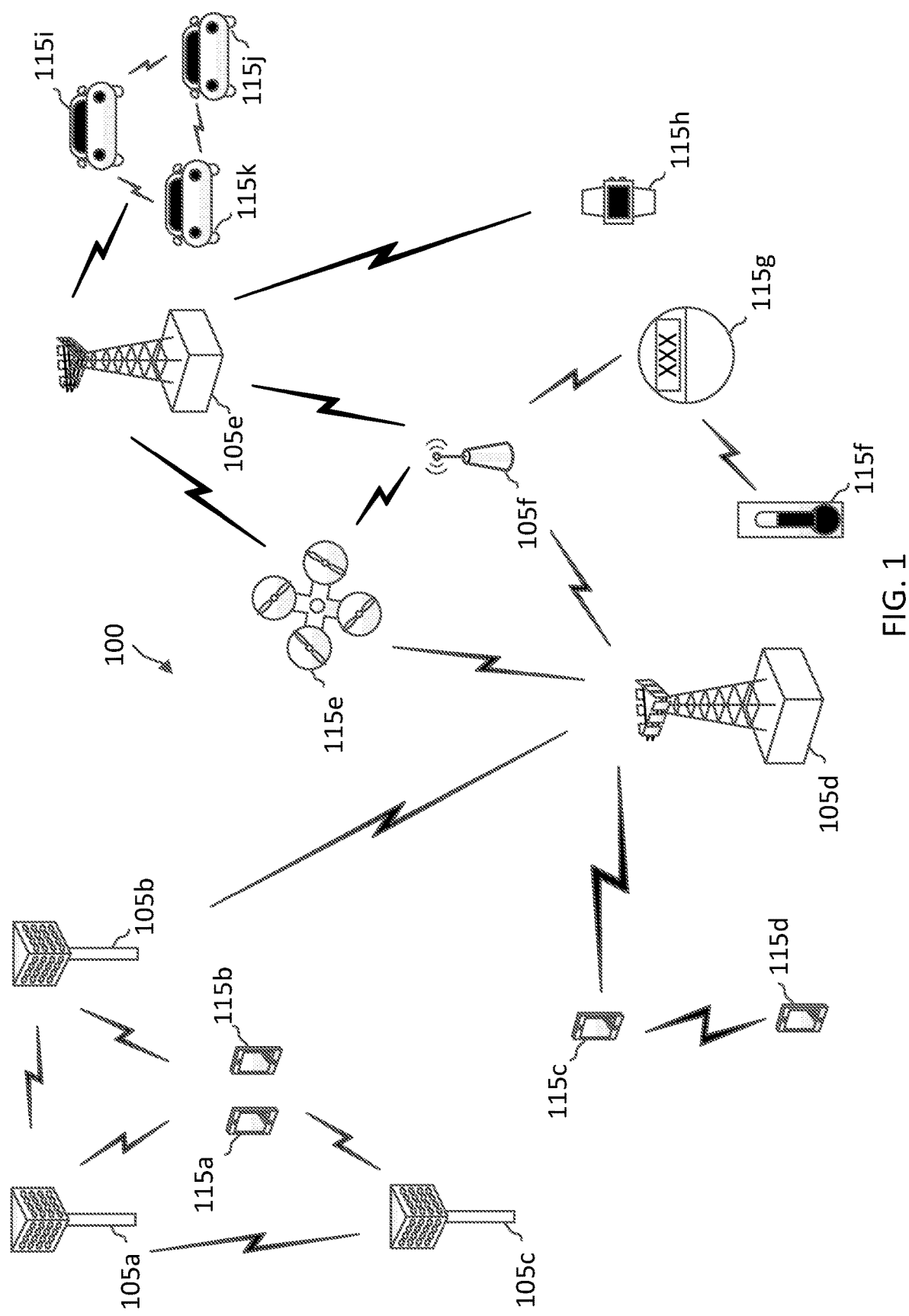
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication. There are various ways that the pre-configurations for the sidelink resource pool may occur. For instance, the sidelink UE may receive the pre-configuration for the sidelink resource pool from a BS while in the coverage of the BS and may apply the pre-configurations when the sidelink UE is out of the coverage of the BS. In some other instances, the sidelink UE may be configured with the pre-configuration for the sidelink resource pool before the UE is deployed, for example, by a manufacturer or an operator. In general, the sidelink UE may receive the pre-configuration for the sidelink resource pool before beginning the mode-2 RRA operations. For this mode, it may be possible for sidelink systems to operate independent of a serving BS.

In an IIoT scenario, a factory or a production plant may include machines, industrial equipment, sensors, actuators, robots, and/or the like operating in assembly lines and/or production lines. The machines, industrial equipment, sensors, actuators, and/or robots may generally be referred to as sensor/actuator (S/A) devices. The production plant may employ programmable logic controllers (PLCs) to control the operations of the S/A devices, for example, by sending control commands to the S/A devices and reading data, records, and/or measurements from the S/A devices. It may be desirable for the PLCs to communicate with the S/A devices over wireless channels, for example, using sidelink. However, a production plant may typically operate in a shielded environment, and thus may be out of the coverage of a BS.

While the mode-2 RRA can support sidelink communications without a serving BS, the mode-2 RRA operations may lack flexibility for IIoT deployments. For instance, a production plant may have different clusters of S/A devices controlled by different PLCs. Communications in different clusters may have different quality of service (QoS) requirements. Additionally, some S/A devices may be relocated to different areas in the plant, for example, due to maintenance or other changes in production lines, and thus the S/A devices may be controlled by different PLCs over time. As such, there is a desire to provide a more flexible stand-alone sidelink system.

The present application describes mechanisms for providing a flexible stand-alone sidelink system for IIoT deployments. For example, a stand-alone system may be formed to enable a group of sidelink UEs to communicate with each other over sidelink without being in a coverage of a serving BS. One or more sidelink UEs in the group may be configured to operate as a coordinator or a controller for sidelink communications in the system, where the one or more sidelink UEs may be referred to as controller UEs. Other sidelink UEs in the group may be referred to as non-controller UEs. A controller UE may broadcast system information associated with the stand-alone system to assist non-controller UEs to participate in sidelink communications. Different controller UEs (e.g., located at different locations) may coordinate and/or control different clusters of non-controller UEs for sidelink communications. In some aspects, the stand-alone sidelink system may be within a shielded production plant including PLCs coordinating and/ or controlling operations of S/A devices. The PLCs and/or the S/A devices may be equipped with wireless communication devices. To facilitate sidelink communications in production plant, the one or more PLCs may be configured to operate as controller UEs and the S/A devices may be configured to operate as non-controller UEs. The PLCs operating as controller UEs may be referred to as PLC UEs. The S/A devices operating as non-controller UEs may be referred to as S/A UEs.

In some aspects, each S/A UE may be preconfigured with a plurality of preconfigured profiles, for example, stored at memory of the S/A UE. There are various ways that sidelink UE may be preconfigured with the preconfigured profiles. For instance, the sidelink UE may be preconfigured with the preconfigured profiles by a manufacturer during manufacturing time or by an operator before deployment. In general, the sidelink UE may be preconfigured with the preconfigured profiles before the sidelink UE begins to listen for sidelink broadcast system information. The preconfigured profile may include information related to the frequency band of operation and/or sidelink resource pools where the S/A UE may transmit and/or receive sidelink transmissions. A PLC UE may broadcast system information to indicate which preconfigured profile the S/A UE may use for sidelink communications. For instance, the PLC UE may transmit a physical sidelink broadcast channel (PSBCH) signal including an indication referencing a first preconfigured profile of the plurality of preconfigured profiles. The PSBCH may be analogous to a PBCH over an Uu interface (e.g., an interface between a BS and a UE). In some aspects, the indication can be an index referencing the first preconfigured profile. For instance, the plurality of preconfigured profiles may be indexed according to a certain indexing order. In some other aspects, the indication can be a zone identifier (ID) identifying the first preconfigured profile. For instance, a geographical area may be divided into multiple zones (e.g., with a certain length and a certain width), each zone may be assigned with a zone ID, which may be numerical value or a string, and each zone may have an associated preconfigured profile. The preconfigured profile may include at least one of a frequency band configuration (e.g., indicating a carrier frequency, a bandwidth part (BWP)) or a radio resource configuration (e.g., indicating a transmit resource pool and/or a receive resource pool and associated congestion control). Accordingly, the S/A UE may monitor for a PSBCH signal from a PLC UE and may select a preconfigured profile from the plurality of preconfigured profiles stored at the S/A UE upon detecting a PSBCH signal.

In some aspects, the PLC UE may further transmit a sidelink remaining minimum system information (RMSI) signal including an additional radio resource management (RRM) configuration, for example, to provide more flexible and/or more advanced radio resource allocations. In some instances, the PSBCH signal may further include a sidelink RMSI pointer pointing to resources where the S/A UE may decode sidelink RMSI scheduling information for the sidelink RMSI signal. In some aspects, the RRM configuration may override a zone configuration in the first preconfigured profile, where the RRM configuration may include at least one of geographical coordinate information, a zone length, a zone width, or a zone-to-resource pool mapping. In some aspects, the RRM configuration may override a congestion control configuration in the first preconfigured profile, where the RRM configuration may include at least one of a channel busy ratio (CBR) or a channel access occupancy ratio (CR) associated with a preconfigured resource pool indicated by the first preconfigured profile. In some aspects, the RRM configuration may indicate one or more resource pools different from a preconfigured resource pool indicated by the first preconfigured profile. In some aspects, the RRM configuration may define different congestion control parameters for different QoS target levels for each resource pool of the one or more resource pools. In some aspects, the RRM configuration may indicate an exceptional transmit resource pool where the S/A UE may access according to some rules instead of the normal SCI sensing (e.g., determining whether a resource is reserved base one SCI).

In some aspects, the S/A UE is expected to operate according to the preconfigured profile indicated by the PSBCH signal once the S/A UE is synchronized to the PSBCH signal. In some aspects, the S/A UE is expected to operate according to the RRM configuration once the S/A UE successfully decodes the RMSI signal. However, in some instances, when the S/A UE does not have a unicast connection with the PLC UE, the S/A UE may respect the RRM configuration for a certain duration and may fall back to the preconfigured profile after the duration. In some aspects, the S/A UE may establish a unicast connection with the PLC UE for sidelink communication and may respect the RRM configuration as long as the unicast connection is maintained. In some aspects, the PLC UE may configure the S/A UE with a dedicated resource pool when the S/A UE has a unicast connection established with the PLC UE.

Aspects of the present disclosure can provide several benefits. For example, storing multiple preconfigured profiles at the S/A UEs and including a profile indication in the broadcast system information can provide the PLC UE with flexibility in selecting a preconfigured profile without causing a high signaling overhead. For instance, the PSBCH signal may carry a sidelink master information block (MIB), which may have a limited number of bits, and the profile indication may be represented by a few bits (e.g., about 2 to support 4 preconfigured profile options) in the sidelink MIB. Additionally, including additional RMSI can provide more advanced and/or more flexible sidelink resource allocations and/or congestion controls. While the present disclosure is described in the context of deploying stand-alone sidelink communication for IIoT applications, the disclosed embodiments can be applied to any suitable sidelink applications operating in a stand-alone sidelink system. Additionally, the disclosed embodiments can be applied to sidelink over any suitable frequency band (e.g., in an unlicensed spectrum and/or licensed spectrum).

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105.

Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA). In some other aspects, the network 100 may support sidelink communication among the UEs 115 in a licensed frequency band.

In some aspects, a UE 115 may be out of the coverage of a BS 105, but may desire to utilize a sidelink to communicate with another UE 115. As discussed above, NR supports a mode-2 RRA, which is an autonomous RRA mode relying on a pre-configuration at a UE 115. The pre-configuration may provide some basic setup for mode-2 RRA operations. There are various ways that the pre-configurations may occur. For instance, a sidelink UE 115 may receive the pre-configuration from a BS 105 while in the coverage of the BS 105 and may apply the pre-configurations when the sidelink UE 115 is out of the coverage of the BS 105. In some other instances, a sidelink UE 115 may be configured with the pre-configuration before the UE 115 is deployed, for example, by a manufacturer or an operator.

The pre-configuration may include a transmit resource pool configuration, a receive resource pool configuration, and/or a zone configuration. The transmit resource pool configuration may configure radio resources (e.g., time-frequency resources) that may be used by the sidelink UE 115 for transmission. To avoid collisions, the sidelink UE 115 may perform sensing in the transmit resource pool prior to accessing a resource in the transmit resource pool. The sensing may include SCI monitoring. For instance, another sidelink UE 115 may indicate a reservation for a sidelink resource in the SCI, and thus the sidelink UE 115 may determine whether a sidelink resource in the transmit resource pool is reserved based on the SCI monitoring. In some instances, the pre-configuration may also specify rules for congestion controls in the transmit resource pool. For example, the UE 115 may not be allowed to utilize the transmit resource pool if a CBR or CR associated with the transmit resource pool is exceeded. The receive resource pool configuration may configure radio resources (e.g., time-frequency resources) that may be used by the sidelink UE 115 for reception. The sidelink UE 115 may perform SCI monitoring in the receive resource pool to determine whether another sidelink UE 115 may have data for the sidelink UE 115. In some instances, the transmit resource pool can be overlapping with the receive resource pool. In some instances, the transmit resource pool and/or the receive resource pool may be in an unlicensed spectrum band, such as a 5 GHz band, a 6 GHz band, and/or an intelligent transport system (ITS) band. The spectrum band may have any suitable BW. In some instances, the spectrum band may have a BW of about 75 MHz or less. The spectrum band can be partitioned into multiple subbands with a BW of about 20 MHz and each sidelink resource may be within a subband. Mechanisms for configuring and/or utilizing a sidelink resource pool as will be discussed more fully below in relation to FIG. 3.

To further avoid collisions, geographical zone-based resource allocation mechanisms can be used. For instance, a resource pool (e.g., a transmit resource pool or a receive resource pool) may be partitioned based on geographical zones. For example, a certain portion of the resource pool may be used by one zone and another portion of the resource pool may be used by another zone. The zone configuration may define geographical coordinates, a zone width, and/or a zone length for a zone. The size or granularity of a zone may vary depending on the area or region of deployment. The zone configuration may also define a mapping between zones and resources in the resource pool. For instance, each zone may be associated with a zone identifier (ID) and each portion in the resource pool may be configured for a certain zone ID. A sidelink UE 115 (e.g., the UE 115*j*) may be a vehicle and may be equipped with a global positioning system (GPS), and thus may be able to determine a zone where the sidelink UE 115 belongs to and determine the resources that are mapped to the corresponding zone.

In some aspects, the network 100 may support IIoT communications. For instance, some of the UEs 115 (e.g., the UEs 115*f-h*) may be part of a production plant. The production plant may operate in a shielded environment, where wireless communication signals from outside the production plant may not be able to penetrate into the production plant. In other words, the UEs 115 within the production plant may be out of the coverage of any BSs 105. Accordingly, the UEs 115 within the production plant may form a stand-alone sidelink system and communicate with each other over sidelinks. In a production plant, some of the UEs 115 may correspond to machines, industrial equipment, sensors, actuators, robots, and the like that are equipped with wireless communication devices and may be referred to as S/A UEs Some of the other UEs 115 in the production plant may correspond to PLCs that are equipped with wireless communication devices and may be referred to as PLC UEs. The PLC UEs 115 may control the operations of the S/A UEs 115. For example, a PLC UE 115 may send control commands to an S/A UE 115 and may read data, record, and/or measurements from the S/A UE 115. In some instances, the S/A UEs 115 may also communicate among each other.

In some aspects, to facilitate communications among the PLC UEs 115 and the S/A UEs 115, the PLC UEs 115 may operate as a sidelink controller. For instance, the PLC UE 115 may broadcast sidelink system information, for example, in a PSBCH, which is analogous to a PBCH between a BS 105 and a UE 115. In some aspects, the PSBCH signal may include a sidelink MIB including system configuration information for sidelink communication. In order to provide flexibility in system configurations without significantly increasing signaling overhead, the S/A UEs 115 may be preconfigured with a plurality of preconfigured profiles and the PSBCH signal may include an indication referencing a certain preconfigured profile. In some aspects, the reference may be an index, for example, referencing a first preconfigured profile of the plurality of preconfigured profiles. In some other aspects, the reference may be a zone index referencing the first preconfigured profile of the plurality of preconfigured profiles. Each of the preconfigured profile may include a zone configuration and/or a radio resource configuration (e.g., for a transmit resource pool and/or a receive resource pool). Accordingly, an S/A UE 115 may monitor for a PSBCH from a PLC UE 115 and may select a preconfigured profile from the plurality of preconfigured profiles stored at the S/A UE 115 based on the indication in a detected PSBCH signal. In some aspects, the PLC UE 115 may also broadcast synchronization signals, for example, similar to the PSS and/or SSS, to assist a S/A UE 115 in synchronizing to the PLC UE 115. Accordingly, an S/A UE 115 may monitor for synchronization signals from the PLC UE 115 and synchronizes to the PLC UE 115. For instance, the S/A UE 115 may synchronize to a timing of the PLC UE 115.

In some aspects, the PLC UE 115 may also override certain parameters in the first preconfigured profile. For instance, the PSBCH signal or the sidelink MIB may include a pointer to sidelink RMSI. The pointer may point to resources (e.g., RBs) where the sidelink RMSI may be received. The sidelink RMSI may include parameters associated with zone definitions, resource pool configurations, and/or congestion control mechanisms overriding zone definitions, resource pool configurations, and/or congestion control mechanisms, respectively, defined in the first preconfigured profile. The sidelink RMSI may provide configurations for additional resource pools with various congestion control parameters and/or QoS parameters. Additionally or alternatively, the sidelink RMSI may provide configurations for an exceptional transmit resource pool. In a regular or normal resource pool, an S/A UE 115 may perform SCI sensing, for example, for a duration of time, to determine a resource in the normal resource pool is available for transmission. In the exceptional resource pool, an S/A UE 115 may access a resource without performing sensing or based on partial sensing (e.g., performing sensing in a shortened duration).

In some aspects, an S/A UE 115 may also establish a unicast connection with the PLC UE 115 for communications. The unicast connection may be a layer 2 connection (e.g., a medium access control (MAC) layer connection). In some aspects, after establishing the unicast connection, the PLC UE 115 may configure the connected S/A UE 115 with a dedicated resource pool. The configuration can be in the form of an RRC message over a PC5 interface. The PC5 interface may refer to the interface between two sidelink UEs 115. The resources in the dedicated resource pool may be dedicated for the unicast connection between the PLC UE 115 and the S/A UE 115. The congestion control in the dedicated resource pool may utilize dedicated channel busy ratio (CBR) and/or channel access occupancy ratio (CR) mechanisms instead of distributed congestion control mechanisms. For instance, a distributed congestion control may specify a range of CRs for a given CBR (e.g., suitable for general sidelink applications) and specify a number of allowable retransmissions without reducing a transmit power. For the same CBR, the dedicated congestion control may specify a lower CR or a lower CR range than the distributed congestion control. Additionally or alternatively, the dedicated congestion control may allow for a greater number of retransmissions without reducing a transmit power than the distributed congestion control. Mechanisms for stand-alone sidelink communications supporting IIoT are described in greater detail herein.

Figure 2:
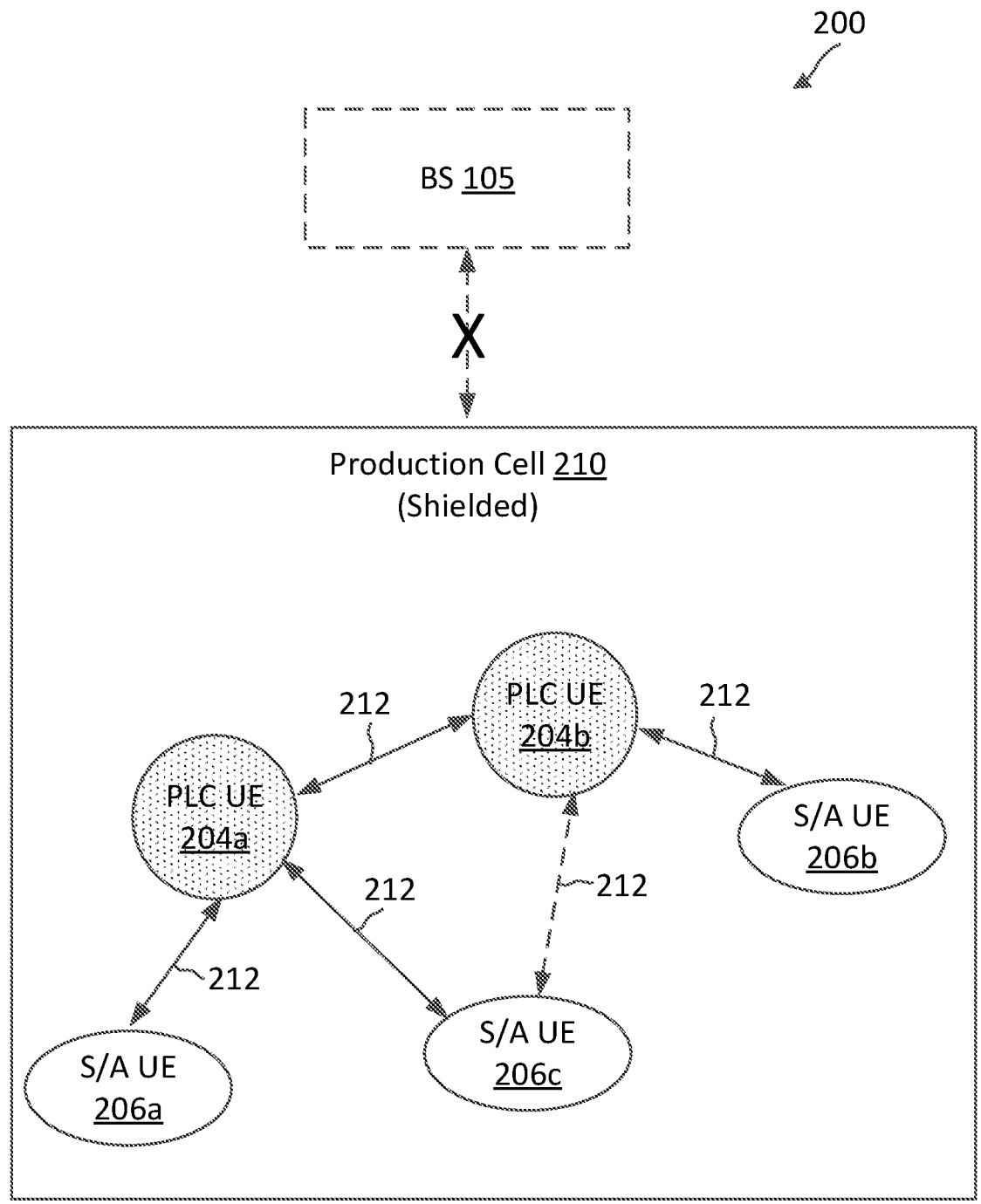
FIG. 2 illustrates an industrial Internet of thing (IIoT) deployment according to some aspects of the present disclosure.

FIG. 2 illustrates an IIoT deployment 200 according to some aspects of the present disclosure. The IIoT deployment 200 may correspond to a portion of the network 100. The IIoT deployment 200 includes a plurality of PLC UEs 204 (shown as 204a and 204b) and a plurality of S/A UEs 206 (shown as 206a, 206b, and 206c) in a production cell 210. Although the IIoT deployment 200 is illustrated with two PLC UEs 204 and three S/A UEs 206, it should be understood in other examples an IIoT deployment can include any suitable number of PLC UEs 204 (e.g., 1, 3, 4, 5, 6 or more) and any suitable number of S/A UEs 206 (e.g., 1, 2, 4, 5, 6, 7, 8, 9, 10 or more). The PLC UEs 204 and the S/A UEs 206 may correspond to UEs 115 in the network 100. The PLC UEs 204 may be PLCs that are equipped with wireless communication devices. The S/A UEs 206 may be machines, industrial equipment, robots, sensors, actuators, and/or the like equipped with wireless communication devices. The PLC UEs 204 may control the operations of the S/A UEs 206, for example, by sending control commands to the S/A UEs 206. The PLC UEs 204 may also read data, record, and/or measurements from the S/A UEs 206. The communication between the PLC UEs 206 and the S/A UEs 204 may be over wireless channels (e.g., the sidelink 212)

The production cell 210 may be within a production plant or factory shielded from the coverage of a BS 105 as shown by the arrow with the cross symbol "X". Thus, the IIoT deployment 200 may operate as a stand-alone sidelink system. To facilitate sidelink communications in the production cell 210 without assistance from the BS 105 while providing configuration flexibility, the S/A UEs 206 may be configured with a plurality of preconfigured profiles for sidelink communications. The preconfigured profiles may include information related to the frequency band of operations and/or radio resource pools. The different preconfigured profiles may be associated with different geographical zones and/or may have different resource pool configurations with different congestion control rules. Each PLC UE 204 may be configured to operate as a sidelink communication controller for a cluster of S/A devices 206 nearby the PLC UE 204. In the illustrated example of FIG. 2, the S/A UE 206a may be associated with the PLC UE 204a, the S/A UE 206b may be associated with the PLC UE 204b, and the S/A UE 206c may be associated with the PLC 204a at one time and may be associated with the PLC 204b at another time.

In some aspects, the PLC UE 204a may broadcast a system information signal in a PSBCH, which is analogous to a PBCH. The system information signal may include an indication of a first preconfigured profile of the plurality of preconfigured profiles as will be discussed more fully below in relation to FIG. 4. The PLC UE 204a may transmit the system information signal periodically. The S/A UE 206a may monitor for a PSBCH signal from a PLC UE 204. Upon receiving a PSBCH signal, the S/A UE 206a may communicate with the PLC UE 204a based on the first preconfigured profile. For instance, the S/A UE 206a may establish a unicast connection with the PLC UE 204a for communication. Similarly, the PLC UE 204b and the S/A UE 206b may utilize similar mechanisms as the PLC UE 204a and the S/A UE 206a for communications. In some instances, the S/A UE 206c may also receive the PSBCH signal from the PLC UE 204a and may establish a unicast connection with PLC UE 204a for communications. In some instances, the S/A UE 206c may be relocated or reconfigured and may receive a PSBCH signal from the PLC UE 204b instead as shown by the sidelink 212 with the dashed-line. As such, the S/A 206c may communicate with the PLC UE 204b instead of the PLC UE 204a. Accordingly, an S/A UE 206c may communicate with different PLC UEs 204 over time. When the S/A UE 206 is synchronized to a certain PLC UE 204, the S/A UE 206 may select a preconfigured profile according to the PSBCH signal received from the corresponding PLC UE 204.

Figure 3:
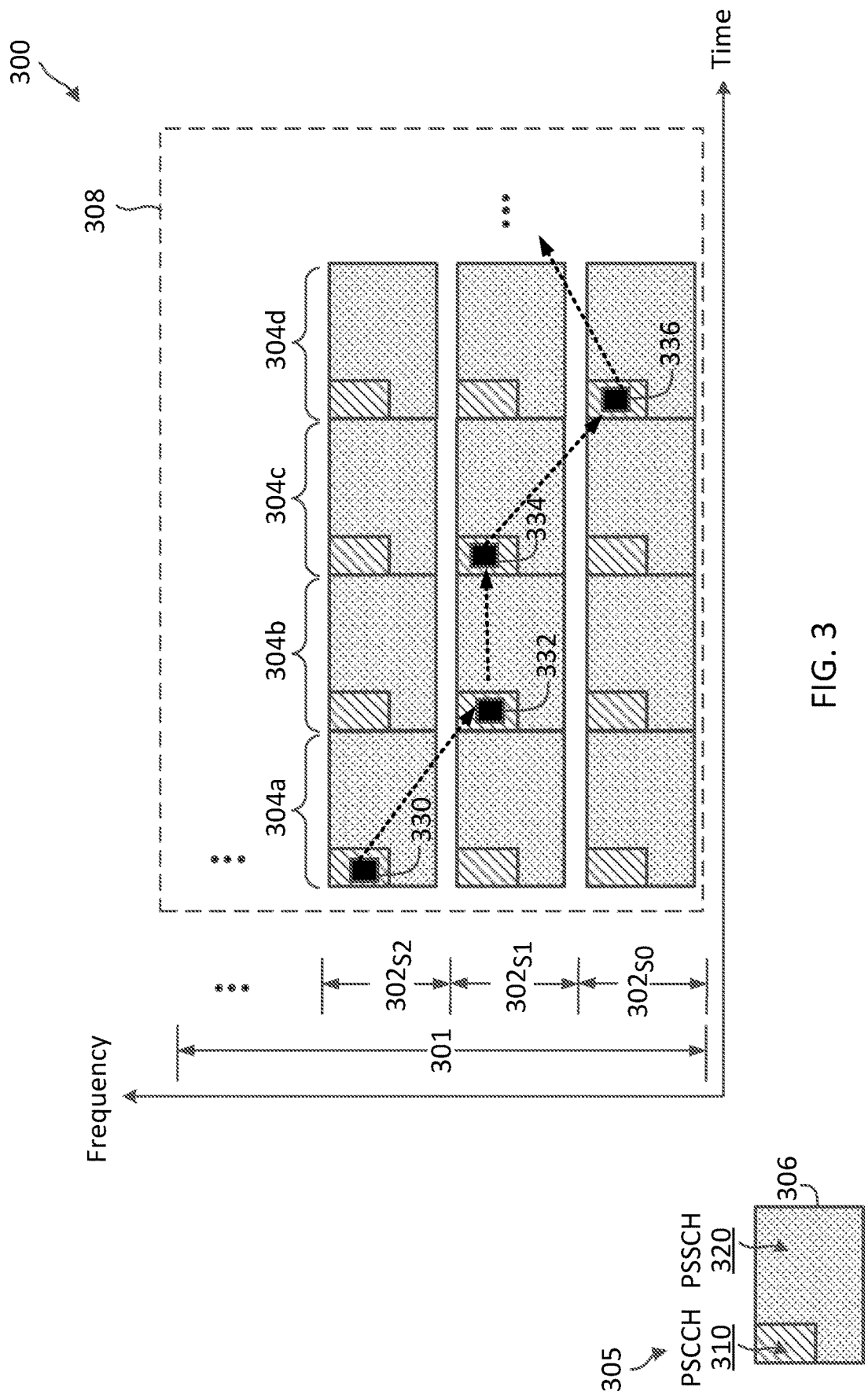
FIG. 3 illustrates a sidelink radio resource allocation and communication scheme according to some aspects of the present disclosure.

FIG. 3 illustrates a sidelink radio resource allocation and communication scheme 300 according to some aspects of the present disclosure. The scheme 300 may be employed by a UE such as the UEs 115 in the network 100 and/or the UEs 204 and/or 206 in the IIoT deployment 200. In particular, sidelink UEs may employ the scheme 300 to communicate sidelink over a radio frequency band (e.g., in a shared spectrum, an unlicensed spectrum, or a licensed band). In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, 304d, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4 GHz unlicensed band and may have a bandwidth of about 80 megahertz (MHz) partitioned into about fifteen 5 MHz frequency subbands 302.

In some instances, a sidelink UE (e.g., the UEs 115, 204, and/or 206) may be equipped with a wideband receiver and a narrowband transmitter. For instance, the UE may utilize the narrowband transmitter to access a frequency subband $302_{s2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{s2}$ may be time-partitioned into a plurality of frames with the frame structure 304.

The frame structure 304 includes a sidelink resource 306 in each frequency subband 302. A legend 305 indicates the types of sidelink channels within a sidelink resource 306. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306. In some aspects, the sidelink frames 304 and/or sidelink resources 306 may be part of a sidelink resource pool 308.

As discussed above, an S/A UE 206 may be preconfigured with a set of preconfigured profiles (e.g., stored at a memory similar to the memory 804 of FIG. 8) and may select a preconfigured profile from the set of stored preconfigured profiles based on a preconfigured profile index or zone index received from a PSBCH signal broadcast by a PLC UE 206. The selected preconfigured profile may include a radio resource configuration. The radio resource configuration may indicate one or more resource pools similar to the resource pool 308 including the sidelink resources 306 in the frequency band 301 and/or the subbands 302 and/or timing information associated with the sidelink frames 304. The one or more resource pools may include a transmit resource pool and/or a receive resource pool. The sidelink resources 306 in a transmit resource pool may be used by the S/A UE 206 to transmit a sidelink communication (e.g., PSCCH 310, a PSSCH 320) to the PLC UE 204. The sidelink resources 306 in a receive resource pool may be used by the S/A UEs 206 to receive a sidelink transmission (e.g., PSCCH 310, a PSSCH 320) from a PLC UE 204. Additionally, the PLC UE 204 can configure additional transmit resource pools (e.g., with different CBRs/CRs for different QoS levels) and/or an exceptional transmit resource pool via sidelink RMSI. The additional transmit resource pools and/or the exceptional transmit resource pool may also be similar to the resource pool 308.

In sidelink communication, in order for an S/A UE 206 to successfully decode the PSCCH 310 and PSSCH 320, information describing the specific resources assigned by the PLC UE 204 for transmission and the transmission configuration can be carried in the sidelink control information, SCI. In this respect, control information for sidelink communication may be communicated in the form of SCI messages. The SCI message may be transmitted over the PSCCH 310, which carries the information related to the transmission of data over the PSSCH 320.

The SCI may inform the S/A UEs 204 about a resource reservation interval, a frequency location of initial transmission and retransmission, a time gap between initial transmission and retransmission, and modulation and coding scheme (MCS) used to modulate the data transmitted over the PSSCH 320.

For mode-2 RRA, the SCI may be populated based on autonomous decisions taken by each PLC UE 204. The structure of the SCI message may include a frequency hopping flag field, a resource block assignment and hopping resource allocation field, a time resource pattern field, MCS field, a time advance field and a group destination identifier field. The structure of the SCI message may include other additional fields that are suitable to support IIoT control signaling. The frequency hopping flag field and the resource block assignment and hopping resource allocation field may provide information for the S/A UEs 206 to identify the RBs where the data channel (e.g., PSSCH 320) resides. The PLC UE 204 may autonomously configure each of these two fields. The identified RBs may belong to a sidelink communication resource pool (e.g., PSSCH resource pool). The time resource pattern field may provide the time-domain resource allocation for the data channel (e.g., PSSCH 320), and in particular the potential subframes used for PSSCH transmission. The MCS field may provide the MCS used for the PSSCH 320, which may be autonomously selected by the PLC UE 204. The timing advance field may provide a sidelink time adjustment for mode-2 RRA or other applicable mode. The group destination identifier field may indicate a group of S/A UEs 206 that are potentially interested in the transmitted message from the PLC UE 204. This may be used by the S/A UE 206 to ignore messages destined to other groups of S/A UEs 206.

In some aspects, the SCI messages may be processed with transport channel encoding to generate SCI message transport blocks, which are then followed with physical channel encoding to generate corresponding PSCCH blocks. The PSCCH blocks are carried on respective subframe resource units for transmission. The S/A UEs 206 may receive one or more resource units over respective subframes to recover the control signaling information, and can extract the data channel allocation and transmission configuration.

The PSCCH 310 can be used for carrying SCI 330. The PSSCH 320 can be used for carrying sidelink data. The sidelink data can be of various forms and types depending on the sidelink application. For instance, when the sidelink application is an IIoT application, the sidelink data may carry IIoT data (e.g., sensor measurements, device measurements, temperature readings, control commands etc.). The PSFCH can be used for carrying feedback information, for example, HARQ ACK/NACK for sidelink data received in an earlier sidelink resource 306.

In some aspects, the scheme 300 is used for synchronous sidelink communication. In other words, the PLC UEs 204 and the S/A UEs 206 are synchronized in time and are aligned in terms of symbol boundary, sidelink resource boundary (e.g., the starting time of sidelink frames 304). The S/A UEs 206 may perform synchronization in a variety of forms, for example, based on sidelink synchronization signals received from a PLC UE 204.

In some aspects, a sidelink UE (e.g., the UEs 115, the PLC UEs 204, and/or the S/A UEs 206) may include, in SCI 330, a reservation for a sidelink resource 306 in a later sidelink frame 304 when transmitting a sidelink transmission. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband 302s2 to reserve a sidelink resource 306 in a next sidelink frame 304b located at the frequency subband 302si. Similarly, during the sidelink frame 304b, the sidelink UE transmits SCI 332 in the sidelink resource 306 located in the frequency subband 302si to reserve a sidelink resource 306 in a next sidelink frame 304c located at the frequency subband 302si. During the sidelink frame 304c, the sidelink UE transmits SCI 334 in the sidelink resource 306 located in the frequency subband 302si to reserve a sidelink resource 306 in a next sidelink frame 304d located at the frequency subband $302_{s0}$. During the sidelink frame 304d, the sidelink UE transmits SCI 336 in the sidelink resource 306 located in the frequency subband $302_{s0}$. The SCI 336 may reserve a sidelink resource 306 in a later sidelink frame 304.

The SCI can also indicate scheduling information and/or a destination identifier (ID) identifying a target sidelink UE for receiving in the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband 302s2 while another pair of sidelink UEs may communicates sidelink data using a sidelink resource 306 in the frequency subband 302si.

While the scheme 300 is described in the context of sidelink transmissions from a PLC UE 204 to an S/A UE 206, similar sensing and/or transmission mechanisms may be applied to sidelink transmissions from an S/A UE 206 to a PLC UE 204 and/or to another S/A UE 206.

Figure 4:
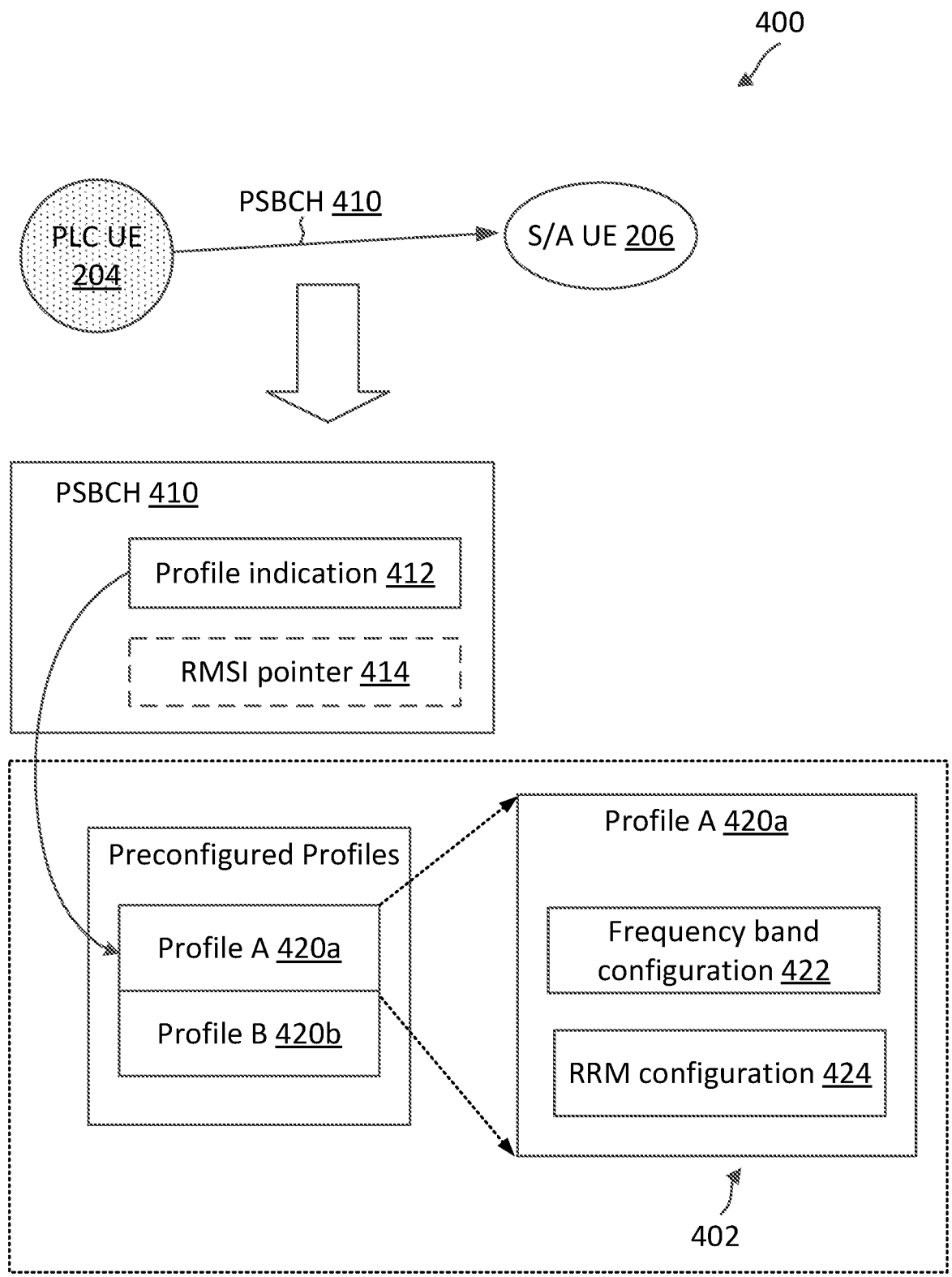
FIG. 4 illustrates a sidelink communication scheme according to some aspects of the present disclosure.

FIG. 4 illustrates a sidelink communication scheme 400 according to some aspects of the present disclosure. The scheme 400 may be employed by a PLC UE 204 and an S/A UE 206 in the IIoT deployment 200 for sidelink communications. In particular, the PLC UE 204 may employ the scheme 400 to communicate sidelink system information (e.g., PSBCH) in a radio frequency band (e.g., in a shared spectrum, an unlicensed spectrum, and/or a licensed spectrum) to support IIoT applications.

In the scheme 400, the PLC UE 204 transmits a PSBCH signal 410 in broadcast mode. The PLC UE 204 may broadcast the PSBCH signal 410 periodically to assist an S/A UE 206 in synchronizing to the PSBCH signal 410. In some instances, the PSBCH signal 410 may be transmitted in a preconfigured frequency band known to the PLC UE 204 and the S/A UE 206. Accordingly, the S/A UE 206 may monitor the preconfigured frequency band for the PSBCH signal 410. The monitoring may include receiving a signal from the channel and decoding a PSBCH signal from the received signal. In some instances, the PLC UE 204 may select a frequency band from a set of preconfigured frequency bands for transmitting the PSBCH signal 410, for example, using various factors such as interference. The set of preconfigured frequency bands may be known to the PLC UE 204 and the S/A UE 206. Accordingly, the S/A UE 206 may monitor for the PSBCH signal 410 in the set of preconfigured bands.

The PSBCH signal 410 may include a profile indication 412. As discussed above, in order to provide flexibility for sidelink configurations with a minimal signaling overhead, the S/A UE 206 may be preconfigured with a plurality of preconfigured profiles 420. The plurality of preconfigured profiles 420 may be stored at a memory (e.g., the memory 804 of FIG. 8) of the S/A UE 206 as shown by the dotted-outline box. The preconfigured profile indication 412 in the PSBCH signal 410 may reference one of the plurality of preconfigured profiles 420 at the S/A UE 206.

In the illustrated example of FIG. 4, the S/A UE 206 is preconfigured with a profile A 420*a* and a profile B 402*b*. Although FIG. 4 illustrates two preconfigured profiles 420 at the S/A UE 206, it should be understood that in other example the S/A UE 206 may be preconfigured with any suitable number of preconfigured profiles 420 (e.g., about 3, 4, 5, or 6). Each of the preconfigured profiles 420 may include a frequency band configuration 422 and a RRM configuration 424. The expanded view 402 illustrates the profile A 420*a* including a frequency band configuration 422 and a RRM configuration 424. The frequency band configuration 422 may indicate a carrier frequency and a frequency band or initial BWP where the S/A UE 206 may operate for sidelink communications or where the S/A UE 206 may monitor for the PSBCH signal 410. The frequency band configuration 422 may also indicate an SCS in the frequency band.

The RRM configuration 424 may include a transmit resource pool configuration and/or a receive resource pool configuration. The transmit resource pool configuration may indicate a resource pool similar to the resource pool 308. The transmit resource pool configuration may include information related to the frequency band (e.g., the frequency band 301) where the transmit resource pool is located, the subband partitions (e.g., the subbands 302) within the transmit resource pool, and/or the resource frame structure (e.g., the frame 304) of the transmit resource pool. The transmit resource pool configuration may define the resources (e.g., the resources 306) in the transmit resource pool in any suitable formats, for example, in units of RBs in frequency and in units of OFDM symbol in time. The receive resource pool configuration may be substantially similar to the transmit resource pool configuration. The sidelink resources in a transmit resource pool may be used by the S/A UE 206 to transmit a sidelink communication (e.g., PSCCH 310, a PSSCH 320) to the PLC UE 204. The sidelink resources 306 in a receive resource pool may be used by the S/A UEs 206 to receive a sidelink transmission (e.g., PSCCH 310, a PSSCH 320) from a PLC UE 204. In some instances, the transmit resource pool may be separate from the receive resource pool. In other words, the transmit resource pool and the receive resource pool may include different time and frequency resources. In some other instances, the transmit resource pool and the receive resource pool may be at least partially overlapping in time and/or frequency.

In some instances, the RRM configuration 424 may also indicate a reference frequency, which may be referred to as point A (e.g., a lowest subcarrier of a common RB 0 in a resource grid) in 5G. The RRM configuration 424 may also indicate an offset to carrier, which may be an offset between point A and a lowest usable subcarrier on this carrier frequency and can be represented in units of physical RBs (PRBs). The RRM configuration 424 may also indicate a starting RB index and/or a RB length or a number of contiguous RBs defining a sidelink BWP. In some instances, the sidelink BWP may correspond to the frequency band where the transmit resource pool and/or the receive resource pool may be configured.

In some aspects, the RRM configuration 424 may also indicate a congestion control rule for the transmit resource pool. The congestion control rule may indicate a CBR threshold and/or a CR threshold. A CBR is a metric indicating a number of subchannels (e.g., the frequency subbands 302) in a sidelink resource pool (e.g., the resource pool 308) with a measured receive signal strength indicator (RSSI) greater than a preconfigured threshold divided by the total number of subchannels in the resource pool. The CBR metric can be computed for a certain number of time intervals or subframes (e.g., the sidelink frames 304). The CBR can provide an estimation on the total state of the channel. In some instances, the S/A UE 206 may compute a CBR by measuring RSSI in the subchannels within the resource pool over a time interval including a number of subframes (e.g., about 100), counting the number of subchannels with an RSSI above the preconfigured threshold in the time interval (e.g., a subchannel count), and dividing the subchannel count by the total number of subchannels in the resource pool. The S/A UE 206 may determine whether to access a resource in the transmit resource pool based on whether the computed CBR satisfies the CBR threshold specified by the RRM configuration 424. For instance, the S/A UE 206 may utilize a resource from the transmit resource pool when the computed CBR is below the CBR threshold and may refrain from utilizing a resource from the transmit resource pool when the computed CBR is above the CBR threshold.

A CR is a metric indicating a number of subchannels (e.g., the frequency subbands 302) occupied by a sidelink UE for transmission divided by a total number of subbchannels in the resource pool. The CR metric can be computed for a certain number of time intervals or subframes (e.g., the sidelink frames 304). The CR can provide an indication of channel utilization by the S/A UE 206. In some instances, the S/A UE 206 may compute a CR by counting a number of subchannels in the resource pool where the S/A UE 206 has an active transmission (e.g., a subchannel count) over a time interval and dividing the subchannel count by the total number of subchannels in the resource pool. The S/A UE 206 may determine whether to access a resource in the transmit resource pool based on whether the computed CR satisfies the CR threshold specifies by the RRM configuration 424. For instance, the S/A UE 206 may utilize a resource from the transmit resource pool when the computed CR is below the CR threshold and may refrain from utilizing a resource from the transmit resource pool when the computed CR is above the CR threshold. In some instances, the RRM configuration 424 may specify different CBRs and/or CRs for different traffic priorities. For example, the RRM configuration 424 may specify that when CBR is 0.9, a sidelink UE (e.g., the S/A UE 206) may limit its CR to 0.1 for a first traffic priority, and may specify that when CBR is 0.5, a sidelink UE (e.g., the S/A UE 206) may limit its CR to 0.3 for another traffic priority.

In some aspects, the RRM configuration 424 may also include a zone configuration. The zone configuration may define a plurality of geographical zones. For instance, the zone configuration may include geographical coordinates, a zone width, and/or a zone length for each geographical zone. In some instances, the zone configuration may define a zone for every 10 kilometers (km), for example, between two geographical locations. In some aspects, the RRM configuration 424 may also include a zone-to-resource mapping. For example, different zones may use different resource pools or different portions of a resource pool.

In some aspects, the different preconfigured profiles 420 may be associated with different regions. For instance, the preconfigured profile A 420a may be used when the S/A UE 206 operates in one country or city, and the preconfigured profile B 420b may be used when the S/A UE 206 operates in another country or city. In some aspects, the different preconfigured profiles 420 may be associated with different network operators. For instance, the preconfigured profile 420a may be used for operations when the S/A UE 206 is operated by one network operator, and the preconfigured profile B 420b may be used when the S/A UE 206 is operated by another operator. In some instances, the different preconfigured profiles 420 may define different operating frequency bands, different resource pool configurations, different congestion controls, and/or different zone-to-resource mappings. In some instances, the different preconfigured profiles 420 may have the same parameters for some of the configurations.

In some aspects, the profile indication 412 may be an index referencing a preconfigured profile 420 at the S/A UE 206. For instance, the preconfigured profile A 420a may be referenced by an index 0 and the preconfigured profile A 420a may be reference by an index 1. Thus, the profile indication 412 may be represented by one bit in a sidelink MIB carried by the PSBCH signal 410. In some other instances, the S/A UE 206 may include four preconfigured profiles 420, and thus the profile indication 412 may be represented by two bits in a sidelink MIB carried by the PSBCH signal 410.

In some aspects, the profile indication 412 may be a zone ID associated with the PLC UE 204. The zone ID may be used to identify a preconfigured profile 420 at the S/A UE 206. For instance, the S/A UE 206 may be preconfigured with a mapping between zone ID and the preconfigured profiles 420. The mapping may associate zone ID 0 with the preconfigured profile B 420b and may associate zone ID 1 with the preconfigured profile A 402a. Accordingly, if the S/A UE 206 detected a PSBCH signal 410 including a profile indication 412 indicating a zone ID 0, the S/A UE 206 may utilize the preconfigured profile B 420b. Alternatively, if the S/A UE 206 detected a PSBCH signal 410 including a profile indication 412 indicating a zone ID 1, the S/A UE 206 may utilize the preconfigured profile A 420a.

In some aspects, the profile indication 412 may include a profile index and a zone ID. The profile index may be used by the S/A UE 206 to select a preconfigured profile 420 from the plurality of preconfigured profiles 420. The zone ID may be used for determining the resource pool or the resource pool portion that is configured for a particular zone identified by the zone ID, for example, based on a zone-to-resource mapping. In some instances, the S/A UE 206 may be equipped with a GPS and thus may be able to determine the zone without relying on the zone ID. In some other instances, the S/A UE 206 may be unable to or fail to determine a zone where the S/A UE 206 is located, and thus may use the broadcast zone ID as a default, for example, for determining the resource pool or the resource pool portion based on a zone-to-resource mapping.

As can be observed in the scheme 400, by preconfiguring the S/A UE 206 with multiple preconfigured profiles 420, the PLC UE 204 may have the flexibility in selecting a preconfigured profile via the profile indication 412, which may include a minimal signaling overhead.

To further provide flexibility and/or more advanced sidelink RRM configurations, the PLC UE 204 may include a sidelink RMSI pointer 414 in the PSBCH signal 410 as shown by the dashed-outline box. The sidelink RMSI pointer 414 may point to or indicate resources (e.g., time-frequency resources) where scheduling information for sidelink RMSI may be transmitted.

Figure 5:
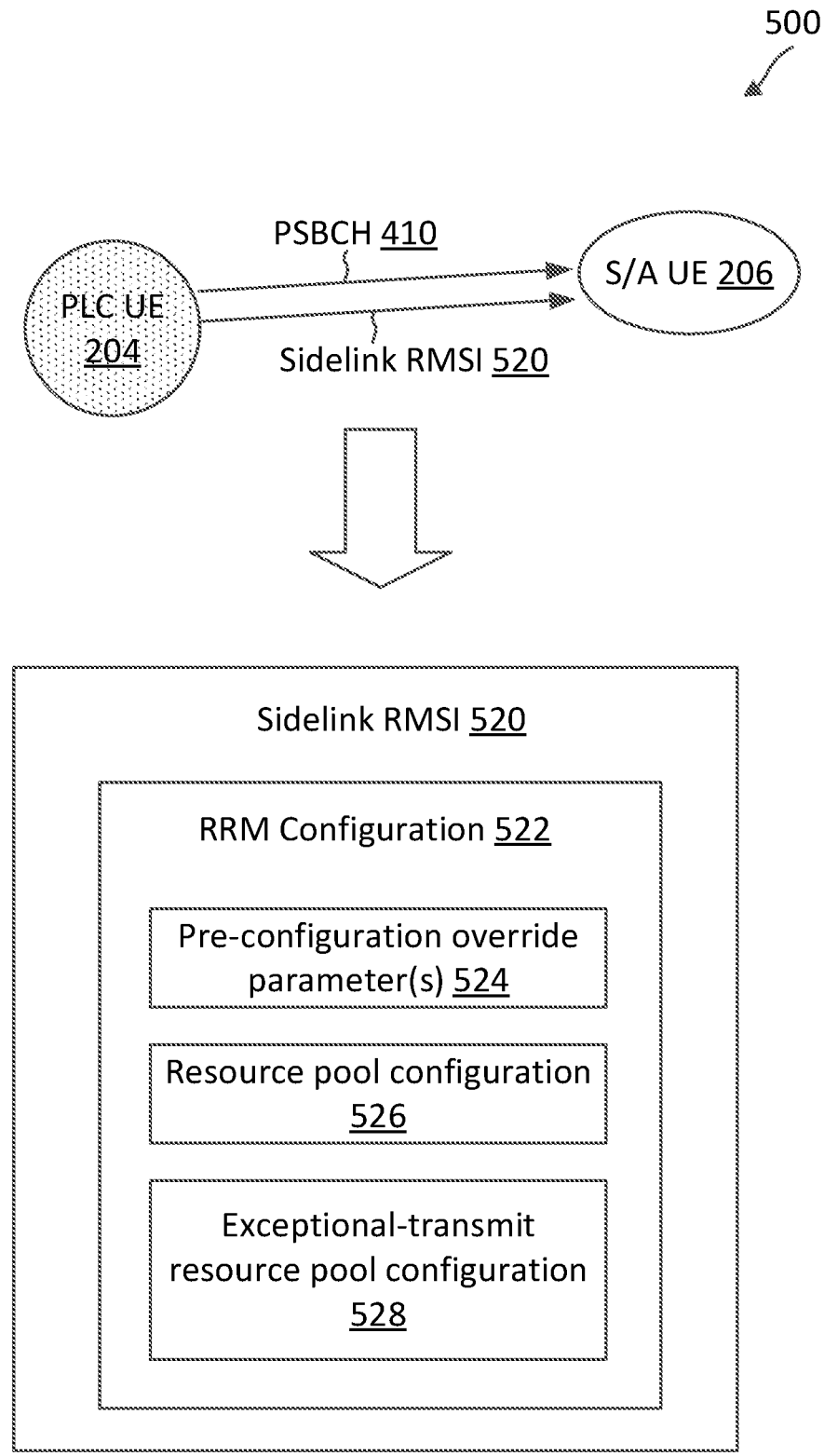
FIG. 5 illustrates a sidelink communication scheme according to some aspects of the present disclosure.

FIG. 5 illustrates a sidelink communication scheme 500 according to some aspects of the present disclosure. The scheme 500 may be employed by a PLC UE 204 and an S/A UE 206 in the IIoT deployment 200 for sidelink communications. In particular, the PLC UE 204 may employ the scheme 500 to communicate sidelink system information (e.g., PSBCH) for IIoT communications a radio frequency band (e.g., in a shared spectrum, an unlicensed spectrum, or a licensed spectrum). The scheme 500 may be implemented in conjunction with the scheme 400.

In the scheme 500, the PLC UE 204 transmits a PSBCH signal 410, for example, by implementing the scheme 400. The PSBCH signal 410 may include a sidelink RMSI pointer 414 as shown in FIG. 4. After transmitting the PSBCH signal 410, the PLC UE 204 transmits a sidelink RMSI signal 520. The sidelink RMSI signal 520 may be transmitted in a broadcast mode in a PSSCH (e.g., the PSSCHs 320). The PLC UE 204 may transmit scheduling information for the sidelink RMSI signal 520 in a resource indicated by the sidelink RMSI pointer 414. The scheduling information may include a resource allocation and/or one or more transmission parameters (e.g., a MCS) to be used for the sidelink RMSI signal 520 transmission. The PLC UE 204 may transmit the sidelink RMSI signal 520 according to the sidelink RMSI scheduling information.

The sidelink RMSI signal 520 may include a RRM configuration 522. In some aspects, the RRM configuration 522 may include one or more pre-configuration override parameters 524 overriding a configuration in a preconfigured profile 420 (e.g., the preconfigured profile A 420a indicated by the profile indication 412). Thus, upon receiving the sidelink RMSI signal 520, the S/A UE 206 may operate according to the one or more pre-configuration override parameters 524 instead of the corresponding configuration parameters in the preconfigured profile A 420a. In some instances, the one or more pre-configuration override parameters 524 may override a zone configuration in the preconfigured profile 420a. For instance, the one or more pre-configuration override parameters 524 may include at least one of geographical coordinate information, a zone length, a zone width, or a zone-to-resource pool mapping. In other words, the S/A UE 206 may determine a zone definition based on the geographical coordinate information, zone length, and/or zone width indicated by the one or more pre-configuration override parameters 524. The S/A UE 206 may also determine a transmit/receive resource pool or resource pool portion based on the zone-to-resource mapping indicated by the one or more pre-configuration override parameters 524.

In some instances, the one or more pre-configuration override parameters 524 may override congestion control mechanisms and/or rules for one or more transmit resource pools configured by the preconfigured profile A 420a. For instance, the one or more pre-configuration override parameters 524 may include at least one of a CBR or a CR associated with a transmit resource pool preconfigured by the preconfigured profile A 420a. For example, the one or more pre-configuration override parameters 524 allow the S/A UE 206 to access the preconfigured transmit resource pool with a higher CBR and/or a higher CR than the CBR and/or CR defined by the preconfigured profile A 420a. In another example, the one or more pre-configuration override parameters 524 may restrict the S/A UE 206 to access the preconfigured transmit resource pool with a lower CBR and/or a lower CR than the CBR and/or CR defined by the preconfigured profile A 420a.

Additionally or alternatively, the RRM configuration 522 may include a resource pool configuration 526 indicating one or more transmit resource pools (for mode-2 RRA operations), for example, different from the transmit resource pools configured by the preconfigured profile A 420a. The one or more transmit resource pools may have a substantially similar resource arrangement as the resource pool 308. In some aspects, the resource pool configuration 526 may indicate different CRs and/or different CBRs for different QoS targets. For instance, the resource pool configuration 526 may configure different CRs for a given CBR to provide different QoS targets. For example, for a given CBR, the resource pool configuration 526 may configure a smaller CR for a higher target QoS. Thus, for the same number of UEs in the system, the overall CBR may be smaller.

In some aspects, the RRM configuration 522 may include an exceptional transmit resource pool configuration 528 indicating an exception transmit resource pool. The exception transmit resource pool may have a substantially similar resource arrangement as the resource pool 308. As discussed above in relation to FIG. 3, an S/A UE 206 may be configured with a sensing window for performing SCI sensing in the resource pool 308 and may transmit in a resource 306 when determining that the resource 306 is not reserved based on the sensing. The S/A UE 206 may be configured to perform the SCI sensing or reservation detection for a regular or normal resource pool (e.g., a non-exceptional resource pool). The S/A UE 206 may be configured to perform sensing, for example, for a certain duration of time. For the sensing, the S/A UE 206 may begin with selecting all sub-channels in the non-exceptional resource pool as candidates and decoding SCI and/or measuring RSSI from the resources in all subchannels within the non-exceptional resource pool. This process may continue for a substantially long period of time. The S/A UE 206 may exclude resources that have a RSSI exceeding a certain threshold and/or with a reservation SCI. The S/A UE 206 may select a candidate resource from the remaining resources in the non-exceptional resource pool. In the exceptional transmit resource pool, the S/A UE 206 may access a resource without performing sensing or may be based on partial sensing (e.g., performing sensing in a shortened duration).

In some aspects, the exceptional transmit resource pool configuration 528 may include rules for accessing the exceptional transmit resource pool. For instance, the exceptional transmit resource pool configuration 528 may specify that the S/A UE 206 may randomly select a subchannel (e.g., the subband 302) from the exceptional transmit resource pool. The exceptional transmit resource pool configuration 528 may further define some rules for performing the random selection. For example, a random selection rule may specify that an S/A UE 206 may select all subchannels within the exceptional transmit resource pool as candidates without the considering RSSI and/or SCI reservations in the exception transmit resource pool. Alternatively, a random selection rule may specify that an S/A UE 206 may randomly select candidate subchannels within the exceptional transmit resource pool without the considering RSSI and/or SCI reservations in the exception transmit resource pool. In some other instances, the exceptional transmit resource pool configuration 528 may allow the S/A UE 206 to access the exceptional transmit resource pool based on carrier sensing medium access/collision avoidance (CSMA/CA) mechanisms, such as LBTs, when the exceptional transmit resource pool is defined over an unlicensed band. The LBT may be based on energy detection as discussed above in relation to FIG. 1. For example, the S/A UE 206 may perform listening in the exceptional transmit resource pool (e.g., in one or more subchannels). If a detected signal in a resource within the exceptional transmit resource pool is above a certain energy detection threshold, the S/A UE 206 may refrain from transmitting in the resource. Conversely, if a detected signal in a resource within the exceptional transmit resource pool is below a certain energy detection threshold, the S/A UE 206 may transmit using the resource.

Figure 6:
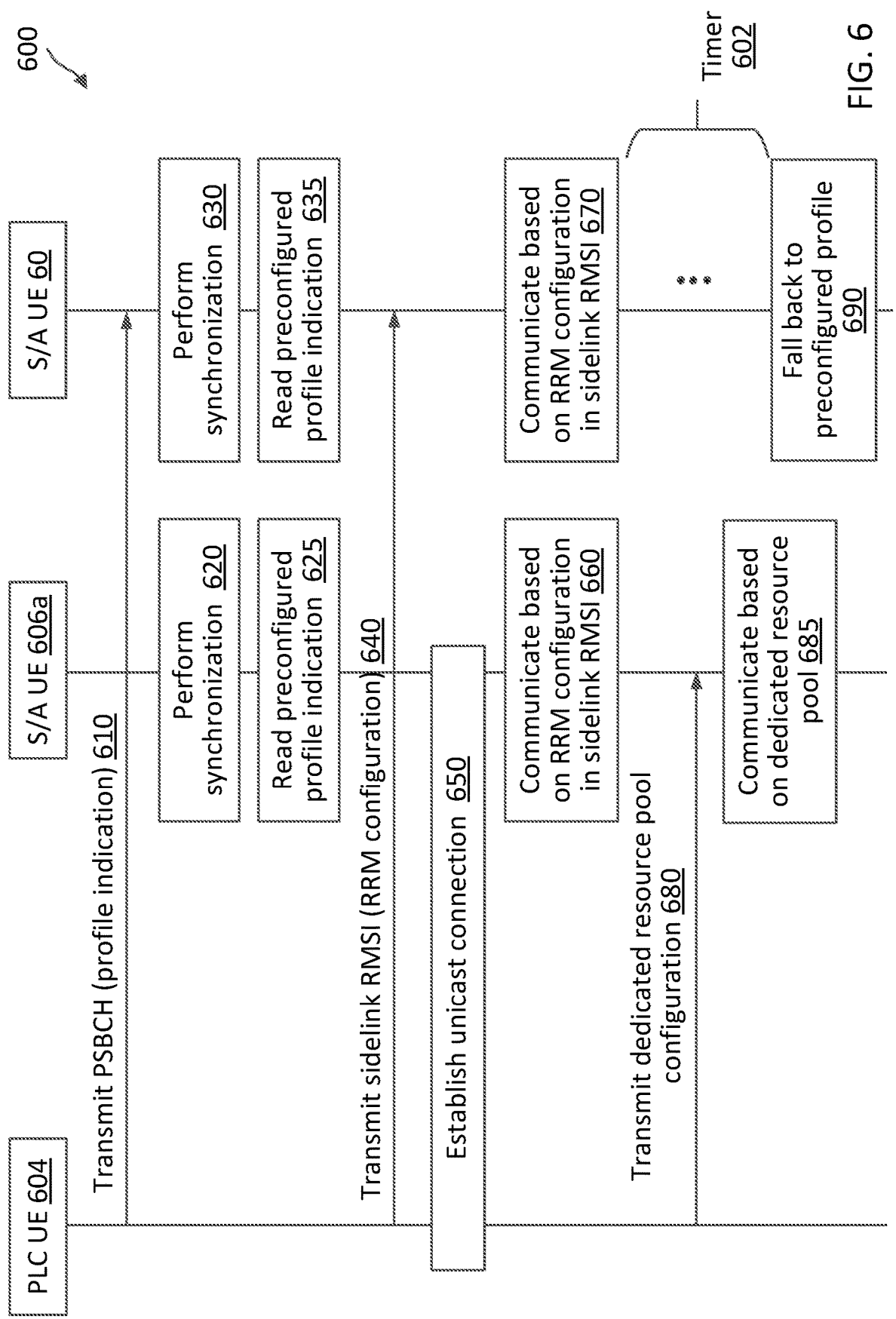
FIG. 6 is a signaling diagram illustrating a sidelink communication method according to some aspects of the present disclosure.

FIG. 6 is a signaling diagram illustrating a sidelink communication method 600 during an initial network access according to some aspects of the present disclosure. The method 600 may be implemented between a PLC UE 604 and two S/A UEs 606 (shown as 606a and 606b). The PLC UE 604 and the S/A UEs 606 may correspond to a PLC UE 204 and S/A UEs 206 in the IIoT deployment 200. Although the method 600 illustrates the PLC UE 604 in communication with two S/A UEs 606, it should be understood that in other examples the PLC UE 604 may communicate with any suitable number of S/A UEs 606 (e.g., about 2, 3, 4, 5, 6 or more). As illustrated, the method 600 includes a number of enumerated actions, but embodiments of the method 600 may include additional actions before, after, and in between the enumerated actions. In some embodiments, one or more of the enumerated actions may be omitted or performed in a different order.

The method 600 may use similar mechanisms as discussed above with reference to FIGS. 4 and 5. Each of the S/A UEs 606a and 606b may be preconfigured with a plurality of profiles similar to the profiles 420. Each of the S/A UEs 606a and 606b may store the preconfigured profiles at a corresponding memory (e.g., the memory 804 of FIG. 8).

At action 610, the PLC UE 604 transmits a PSBCH signal, for example, in a broadcast mode. The PSBCH signal may be similar to the PSBCH signal 410, for example, including a profile indication similar to the profile indication 412. The PLC UE 604 may also transmit synchronization signals as part of the broadcast. The synchronization signals may be similar to a PSS and/or SSS transmitted by a BS (e.g., the BSs 105). The synchronization signal may have a predetermined signal waveform. The PLC UE 604 may transmit the PSBCH signal and/or the synchronization signals periodically according to some predetermined periodicity (e.g., about 10 ms, 20 ms, 40 ms, 80 ms, or 160 ms) to enable the S/A UEs 606a and/or 606b to synchronize to the PLC UE 606.

At action 620, the S/A UE 606a performs synchronization to the PLC UE 604. For instance, the S/A UE 606a may monitor for a PSBCH signal in a certain frequency band. The S/A UE 606*a* may be preconfigured with the frequency band. The S/A UE 606*a* may search for a synchronization signal, for example, by computing a correlation between the predetermined waveform and a signal received from the channel. Upon detecting the synchronization signal (e.g., the correlation satisfying a certain threshold), the S/A UE 606*a* may adjust its timing (e.g., symbol timing) based the synchronization signal.

At action 625, upon detecting the PSBCH signal, the UE 606*a* reads the profile indication from the PSBCH signal. After obtaining the profile indication, the UE 606*a* may select a preconfigured profile from the plurality of preconfigured profiles stored at the S/A UE 606*a* based on the profile indication. For example, the profile indication may be an index or a zone ID that references a preconfigured profile in the plurality of preconfigured profiles.

At action 630, the S/A UE 606*b* performs synchronization to the PLC UE 604, for example, using similar mechanisms as the S/A UE 606*a* at action 620.

At action 635, upon detecting the PSBCH signal, the UE 606*b* reads the profile indication from the PSBCH signal. After obtaining the profile indication, the UE 606*b* may select a preconfigured profile from the plurality of preconfigured profiles stored at the UE 606*b* based on the profile indication.

Action 640, the PLC UE 604 transmits a sidelink RMSI signal, for example, in a PSSCH 320. The sidelink RMSI signal may be similar to the sidelink RMSI signal 520. For instance, the PLC UE 604 may include a sidelink RMSI pointer (e.g., the sidelink RMSI pointer 414) in the PSBCH signal transmitted at action 610. The sidelink RMSI pointer may point to resources (e.g., time-frequency resources) where scheduling information for the sidelink RMSI signal may be transmitted. The PLC UE 604 may transmit the sidelink RMSI signal according to the sidelink RMSI scheduling information. The sidelink RMSI signal may include an RRM configuration similar to the RRM configuration 522. Accordingly, each of the S/A UEs 606*a* and 606*b* may monitor for the sidelink RMSI scheduling information based on the sidelink RMSI pointer. Upon receiving the sidelink RMSI scheduling information, each of the S/A UEs 606*a* and 606*b* may receive the sidelink RMSI signal according to the sidelink RMSI scheduling information.

At action 650, the S/A UE 606*a* may establish a unicast connection with the PLC UE 604. For example, the S/A UE 606*a* may transmit a sidelink connection request to the PLC UE 604, and the PLC UE 604 may respond with a sidelink connection response.

At action 660, after establishing the connection, the S/A UE 606*a* communicates with the PLC UE 604 according to the RRM configuration indicated by the sidelink RMSI signal. For instance, if the RRM configuration includes parameters (e.g., the pre-configuration override parameters 524) overriding a pre-configuration at the S/A UE 606*a*, the S/A UE 606*a* may apply the parameters indicated by the RRM configuration instead of the pre-configuration. If the RRM configuration includes a resource pool configuration (e.g., the resource pool configuration 526), the S/A UE 606*a* may utilize a resource pools and/or associated congestion control parameters (e.g., CBRs and/or CRs) indicated by the resource pool configuration for transmissions. For example, the S/A UE 606*a* may perform SCI sensing to determine whether a resource in the resource pool is available for transmission based on SCI reservation monitoring and/or RSSI measurements from the resource pool. The congestion control parameters may be dependent on target QoS levels as discussed above in relation to FIG. 5. If the RRM configuration includes an exceptional transmit resource pool configuration (e.g., the exceptional transmit resource pool configuration 528), the S/A UE 606*a* may utilize an exceptional transmit resource pool and/or associated congestion control parameters (e.g., CBRs and/or CRs) indicated by the resource pool configuration for transmissions. The RRM configuration may include sensing rules for accessing the exceptional transmit resource pool configuration as discussed above in relation to FIG. 5. In some instances, the S/A UE 606*a* may utilize the exceptional transmit resource for transmissions when the S/A UE 606*a* lost sensing (e.g., failed to locate an available resource) in a normal resource pool (e.g., a preconfigured resource pool and/or a resource pool configured by the resource pool configuration) and has high-priority data to transmit. In some instances, the S/A UE 606*a* may be allowed to utilize the exceptional transmit resource pool a certain duration for transmission. The maximum allowable transmission duration for using a resource from the exceptional transmit resource pool may be dependent on the traffic priority of the transmission.

At action 670, after receiving the sidelink RMSI signal, the S/A UE 606*b* may also communicate with the PLC UE 604 according to the RRM configuration indicated by the sidelink RMSI signal. The S/A UE 606*b* may utilize resource pools and/or override parameters indicated by the RRM configuration as the S/A UE 606*a* described at action 660. However, the S/A UE 606*b* may not have a unicast connection established with the PLC UE 604. When the S/A UE 606*b* does not have a unicast connection established with the PLC UE 604, the S/A UE 606*b* may respect the RRM configuration (e.g., operate according to the RRM configuration) once the S/A UE 606*b* decoded the RSMI signal. However, the S/A UE 606*b* may operate according to the RRM configuration for a certain duration (e.g., T milliseconds (ms)). For instance, the S/A UE 606*b* may start a timer 602 with a duration of T ms upon decoding the sidelink RMSI signal and may operate according to the RRM configuration while the timer 602 is in progress.

At action 690, after the timer 602 expires, the S/A UE 602*b* may fall back to the preconfigured profile (referenced by the profile indication in the PSBCH signal).

At action 680, after establishing the unicast connection with the S/A UE 606*a*, the PLC UE 604 may transmit a dedicated resource pool configuration to the S/A UE 606*a*. The dedicated resource pool configuration can be a PC5-RRC configuration. The dedicated resource pool configuration may indicate a transmit resource pool with resources dedicated for use by communications over the unicast connection. The S/A UE 606*a* may not apply the distributed congestion control mechanisms for the dedicated resource pool. In some instances, the configuration may indicate a CBR and/or a CR for accessing resources in the dedicated resource pool. For instance, a distributed congestion control may specify a range of CRs for a given CBR (e.g., suitable for general sidelink applications) and specify a number of allowable retransmissions without reducing a transmit power. For the same CBR, the dedicated congestion control may specify a lower CR or a lower CR range than the distributed congestion control. Additionally or alternatively, the dedicated congestion control may allow for a greater number of retransmissions without reducing a transmit power than the distributed congestion control.

At action 685, after the dedicated transmit resource pool is configured, the S/A UE 606*a* may utilize resources in the dedicated resource pool for transmission. The S/A UE 606*a* may perform sensing in the dedicated resource pool to determine a resource for transmission based on the CBR/CR rules specified for the dedicated transmit resource pool. In some instances, the S/A UE 606*a* may utilize the exceptional transmit resource pool before sensing is completed in the dedicated resource pool.

Figure 7:
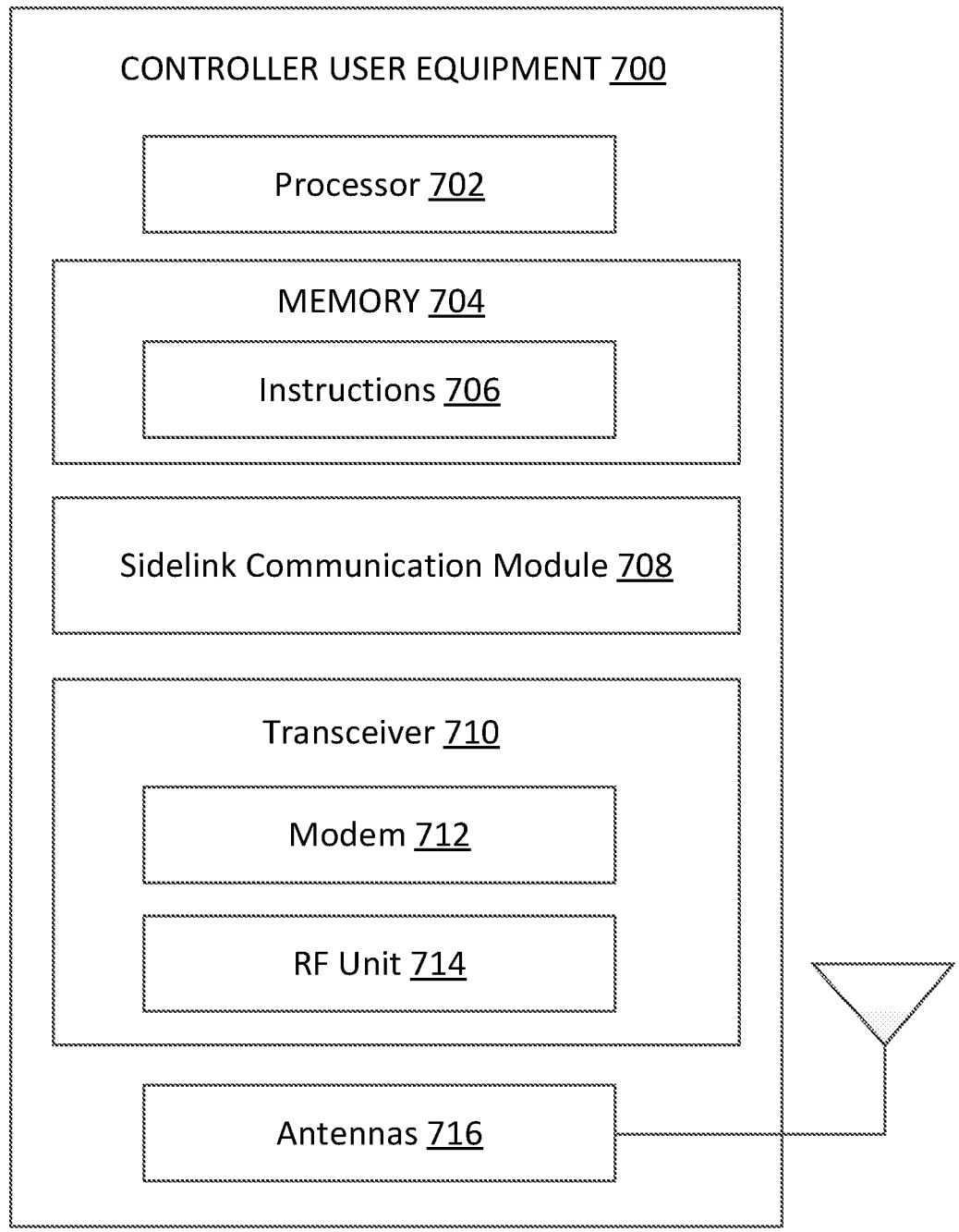
FIG. 7 is a block diagram of an exemplary controller user equipment (UE) according to some aspects of the present disclosure.

FIG. 7 is a block diagram of an exemplary controller UE 700 according to some aspects of the present disclosure. The controller UE 700 may be a UE 115 in the network 100 as discussed above in FIG. 1, a PLC UE 204 as discussed above in FIG. 2-5, or a PLC UE 604 as discussed above in FIG. 6. As shown, the controller UE 700 may include a processor 702, a memory 704, a sidelink communication module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-6. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 708 may be implemented via hardware, software, or combinations thereof. For example, the sidelink communication module 708 may be implemented as a processor, circuit, and/or instructions 706 stored in the memory 704 and executed by the processor 702. In some examples, the sidelink communication module 708 can be integrated within the modem subsystem 712. For example, the sidelink communication module 708 can be implemented by a combination of software components (e.g., executed by a DSP or a general processor) and hardware components (e.g., logic gates and circuitry) within the modem subsystem 712.

The sidelink communication module 708 may be used for various aspects of the present disclosure, for example, aspects of FIGS. 1-6. The sidelink communication module 708 is configured to transmit a sidelink system information signal including an indication (e.g., the profile indication 412) of a first preconfigured profile of a plurality of preconfigured profiles (e.g., the preconfigured profiles 420). In some aspects, the sidelink information signal may be a PSBCH signal (e.g., the PSBCH signal 410) including an index referencing the first preconfigured profile. In some aspects, the sidelink information signal may be a PSBCH including a zone ID identifying the first preconfigured profile. The sidelink communication module 708 may also be configured to communicate a first sidelink transmission based at least in part on the first preconfigured profile. The sidelink communication module 708 may also be configured to transmit a sidelink RMSI signal (e.g., the sidelink RMSI signal 520) including an RRM configuration.

In some aspects, the first preconfigured profile comprises at least one of a frequency band configuration or a radio resource configuration as discussed above with reference to FIG. 4. In some aspects, the RRM configuration in the sidelink RMS signal may override a zone configuration and/or a congestion control configuration in the first preconfigured profile and/or indicate one or more resource pools (different from a preconfigured resource pool indicated by the first preconfigured profile) and/or an exceptional transmit resource pool as discussed above with reference to FIG. 5.

In some aspects, the sidelink communication module 708 may be further configured to transmit a synchronization signal to provide a reference synchronization source for one or more sidelink UEs (e.g., the UEs 115, the S/A UEs 206 and/or 606), establish a unicast connection with a sidelink UE, and/or configure the sidelink UE with a dedicated transmit resource pool (e.g., via a PC5-RRC configuration).

As shown, the transceiver 710 may include the modem subsystem 712 and the RF unit 714. The transceiver 710 can be configured to communicate bi-directionally with other devices, such as the UEs 115, and/or the UEs 115, 204, 206, 604, and/or 606, and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 712 (on outbound transmissions) or of transmissions originating from another source such as a UE 115. The RF unit 714 may be further configured to perform analog beamforming in conjunction with the digital beamforming. Although shown as integrated together in transceiver 710, the modem subsystem 712 and/or the RF unit 714 may be separate devices that are coupled together at a UE 115, 204, or 604 to enable the UE 115, 204, or 604 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., PSCCH, PSSCH, PSFCH, measurement data, and/or sensor data records) to the sidelink communication module 708 for processing. The antennas 716 may include multiple antennas of similar or different designs in order to sustain multiple transmission links.

In some aspects, the transceiver 710 is configured to communicate with components of the controller UE 700 to transmit a sidelink system information signal including an indication of a first preconfigured profile of a plurality of preconfigured profiles and communicate, with a second sidelink UE, a first sidelink transmission based at least in part on the first preconfigured profile.

In an aspect, the controller UE 700 can include multiple transceivers 710 implementing different RATs (e.g., NR and LTE). In an aspect, the controller UE 700 can include a single transceiver 710 implementing multiple RATs (e.g., NR and LTE). In an aspect, the transceiver 710 can include various components, where different combinations of components can implement different RATs.

Figure 8:
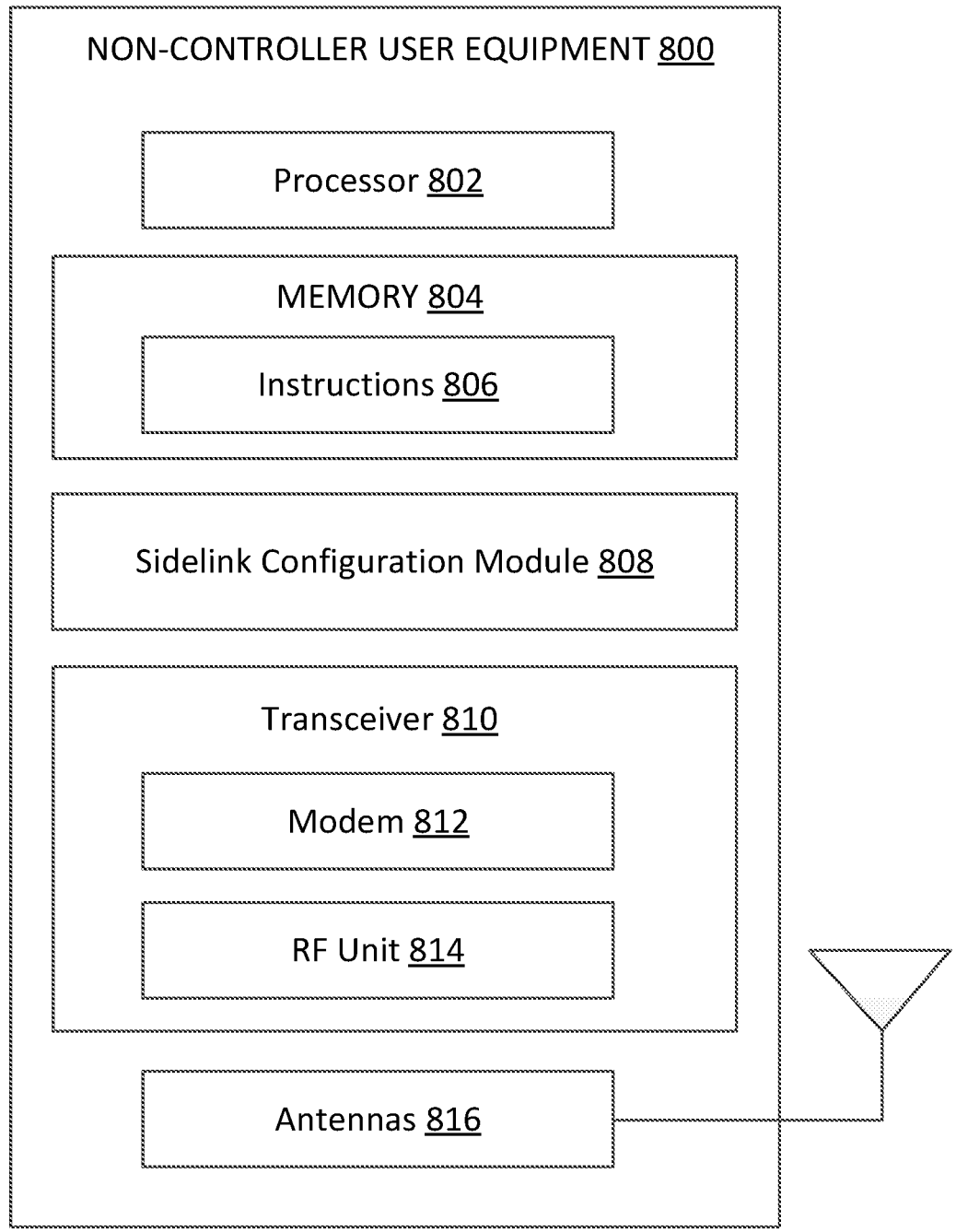
FIG. 8 is a block diagram of an exemplary non-controller UE according to some aspects of the present disclosure.

FIG. 8 is a block diagram of an exemplary non-controller UE 800 according to some aspects of the present disclosure. The non-controller UE 800 may be a UE 115 as discussed above with respect to FIG. 1, an S/A UE 206 as discussed above in FIG. 2-5, or an S/A UE 606 as discussed above in FIG. 6. As shown, the non-controller UE 800 may include a processor 802, a memory 804, a sidelink communication module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 1-6. Instructions 806 may also be referred to as program code, which may be interpreted broadly to include any type of computer-readable statement(s) as discussed above with respect to FIG. 7.

The sidelink communication module 808 may be implemented via hardware, software, or combinations thereof. For example, the sidelink communication module 808 may be implemented as a processor, circuit, and/or instructions 806 stored in the memory 804 and executed by the processor 802. In some examples, the sidelink communication module 808 can be integrated within the modem subsystem 812. For example, the sidelink communication module 808 can be implemented by a combination of software components (e.g., executed by a DSP or a general processor) and hardware components (e.g., logic gates and circuitry) within the modem subsystem 812.

The sidelink communication module 808 may be used for various aspects of the present disclosure, for example, aspects of FIGS. 1-6. The sidelink communication module 808 is configured to receives, from a second sidelink UE (e.g., the UEs 115 and/or the PLC UEs 204 and/or 604), a sidelink system information signal including an indication (e.g., the profile indication 412) of a first preconfigured profile of a plurality of preconfigured profiles (e.g., the preconfigured profiles 420). The plurality of preconfigured profiles may be stored at the memory 804. In some aspects, the sidelink information signal may be a PSBCH signal (e.g., the PSBCH signal 410) including an index referencing the first preconfigured profile. In some aspects, the sidelink information signal may be a PSBCH including a zone ID identifying the first preconfigured profile. The sidelink communication module 808 may also be configured to communicate a first sidelink transmission based at least in part on the first preconfigured profile. The sidelink communication module 808 may also be configured to receive a sidelink RMSI signal (e.g., the sidelink RMSI signal 520) including an RRM configuration. The sidelink communication module 808 may also be configured to synchronize (e.g., a timing synchronization) to the second sidelink UE prior to communicating the first sidelink transmission.

In some aspects, the first preconfigured profile comprises at least one of a frequency band configuration or a radio resource configuration as discussed above with reference to FIG. 4. In some aspects, the RRM configuration in the sidelink RMS signal may override a zone configuration and/or a congestion control configuration in the first preconfigured profile and/or indicate one or more resource pools (different from a preconfigured resource pool indicated by the first preconfigured profile) and/or an exceptional transmit resource pool as discussed above with reference to FIG. 5.

In some aspects, the sidelink communication module 808 may be further configured to establish, with the second sidelink UE, a unicast connection, communicate a second sidelink transmission using a first resource in the exceptional transmit resource pool based on the unicast connection, receive, from the second sidelink UE, a configuration for a dedicated resource pool for the second sidelink UE (e.g., via a PC5-RRC configuration), and/or communicate a third sidelink transmission using a second resource in the dedicated resource pool.

In some other aspects, the sidelink communication module 808 may be further configured to start a timer (e.g., the timer 602) in response to receiving the sidelink RMSI signal based on the non-controller UE 800 not having a unicast connection with the second sidelink UE, communicate a second sidelink transmission based on the RRM configuration while the timer is in progress, fall back to the preconfigured profile after the timer expires, and communicate a third sidelink transmission using the first preconfigured profile base may be based on the expiration of the timer.

As shown, the transceiver 810 may include the modem subsystem 812 and the RF unit 814. The transceiver 810 can be configured to communicate bi-directionally with other devices, such as the BSs 105 and/or the UEs 115, 204, 206, 604, and/or 606. The modem subsystem 812 may be configured to modulate and/or encode the data from the memory 804 and/or the sidelink communication module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PSCCH, PSSCH, PSFCH, measurement data, and/or sensor data records) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may include one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., PSBCH, sidelink RMSI, PSSCH, PSCCH, PSFCH, PC5-RRC configuration, control commands) to the SSB module 808 for processing. The antennas 816 may include multiple antennas of similar or different designs in order to sustain multiple transmission links. The RF unit 814 may configure the antennas 816.

In some aspects, the transceiver 810 is configured to communicate with components of the non-controller UE 800 to receive, from a second sidelink UE, a sidelink system information signal including an indication of a first preconfigured profile of a plurality of preconfigured profiles and communicate a first sidelink transmission based at least in part on the first preconfigured profile.

In an aspect, the non-controller UE 800 can include multiple transceivers 810 implementing different RATs (e.g., NR and LTE). In an aspect, the non-controller UE 800 can include a single transceiver 810 implementing multiple RATs (e.g., NR and LTE). In an aspect, the transceiver 810 can include various components, where different combinations of components can implement different RATs.

Figure 9:
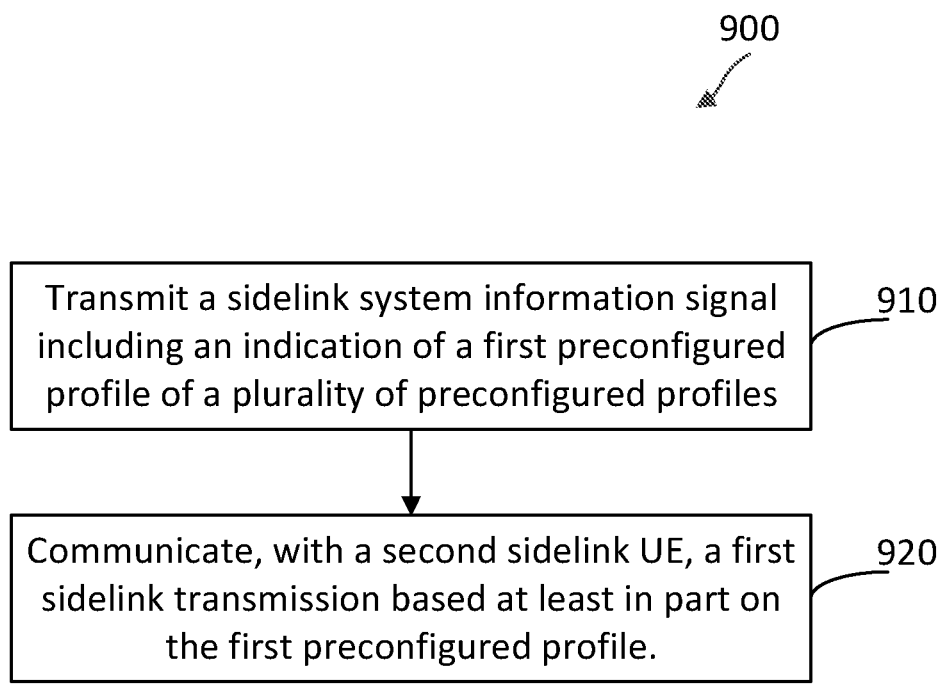
FIG. 9 is a flow diagram of a sidelink communication method according to some aspects of the present disclosure.

FIG. 9 is a flow diagram of a sidelink communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a UE 115, a PLC UE 204, a PLC UE 604, or a controller UE 700, may utilize one or more components, such as the processor 702, the memory 704, the sidelink communication module 708, the transceiver 710, the modem 712, and/or the one or more antennas 716, to execute the steps of method 900. The method 900 may employ similar mechanisms as described above in FIGS. 1-6. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a first sidelink UE transmits a sidelink system information signal including an indication (e.g., the profile indication 412) of a first preconfigured profile of a plurality of preconfigured profiles (e.g., the preconfigured profiles 420). The first sidelink UE may correspond to a UE 115, a PLC UE 204, a PLC UE 604, or a controller UE 700. In some instances, the first sidelink UE may utilize one or more components, such as the processor 702, the memory 704, the sidelink communication module 708, the transceiver 710, the modem 712, and/or the one or more antennas 716, to transmit the sidelink system information signal including the indication of the first preconfigured profile of the plurality of preconfigured profiles.

In some aspects, as part of transmitting the sidelink system information signal, the first sidelink UE may transmit a PSBCH signal (e.g., the PSBCH signal 410) including an index referencing the first preconfigured profile. In some instances, the first sidelink UE may transmit the PSBCH signal in a preconfigured frequency subchannel, which may be known to other sidelink UEs. In some aspects, as part of transmitting the sidelink system information signal, the first sidelink UE may transmit a PSBCH signal including a zone ID identifying the first preconfigured profile.

At block 920, the first sidelink UE communicates, with a second sidelink UE, a first sidelink transmission based at least in part on the first preconfigured profile. The second sidelink UE may correspond to a UE 115, an S/A UE 206, an S/A UE 604, or a non-controller UE 800. In some instances, the first sidelink UE may utilize one or more components, such as the processor 702, the memory 704, the sidelink communication module 708, the transceiver 710, the modem 712, and/or the one or more antennas 716, to communicate the first sidelink transmission with the second sidelink UE. In some instances, the first sidelink UE may transmit the first sidelink transmission to the second sidelink UE. In some instances, the first sidelink UE may receive the first sidelink transmission from the second sidelink UE. The first sidelink transmission may include a PSCCH, PSSCH, and/or a PSFCH transmission.

In some aspects, the first preconfigured profile comprises at least one of a frequency band configuration or a radio resource configuration, for example, as discussed above with reference to FIG. 4. In some aspects, the first preconfigured profile includes the resource radio configuration indicating at least one of a sidelink transmit resource pool or a sidelink receive resource pool. As part of communicating the first sidelink transmission, the first sidelink UE may communicate the first sidelink transmission using a resource (e.g., the sidelink resource 306 of FIG. 3) in the at least one of the sidelink transmit resource pool or the sidelink receive resource pool.

In some aspects, the first sidelink UE may further transmit a sidelink RMSI signal (e.g., the RMSI signal 520) including an RRM configuration, for example, as discussed above with reference to FIG. 5. In some aspects, the RRM configuration overrides a zone configuration in the first preconfigured profile, the RRM configuration comprising at least one of geographical coordinate information, a zone length, a zone width, or a zone-to-resource pool mapping. In some aspects, the RRM configuration overrides a congestion control configuration in the first preconfigured profile, the RRM configuration comprising at least one of a CBR or a CR associated with a preconfigured resource pool indicated by the first preconfigured profile. In some aspects, the RRM configuration indicates one or more resource pools different from a preconfigured resource pool indicated by the first preconfigured profile. In some aspects, the RRM configuration further indicates a plurality of congestion control parameters for a first resource pool of the one or more resource pools, where each congestion control parameter of the plurality of congestion control parameters is associated with a different QoS. In some aspects, the RRM configuration indicates an exceptional transmit resource pool associated with a first sensing rule different from a second sensing rule associated with a normal transmit resource pool. In some aspects, the first sensing rule allows a random sub-channel selection in the exceptional transmit resource pool without sensing. The sensing may be SCI sensing as discussed above with reference to FIGS. 3 and 5. In some aspects, the exceptional transmit resource pool is in an unlicensed spectrum band, and the first sensing rule indicates a CSMA based LBT for accessing the exceptional transmit resource pool. The LBT can be based on an energy detection as discussed above with reference to FIG. 1.

In some aspects, the first sidelink UE may further transmit a synchronization signal to provide a reference synchronization source for one or more sidelink UEs including the second sidelink UE. In some aspects, the first sidelink UE may further establish, with the second sidelink UE, a unicast connection. For instance, the first sidelink UE may exchange a connection request and a connection response with the second sidelink UE. In some aspects, the first sidelink UE may further transmit, to the second sidelink UE, a configuration for a dedicated resource pool for the second sidelink UE based on the unicast connection. In some aspects, as part of transmitting the configuration for the dedicated resource pool, the first sidelink UE may transmit, to the second sidelink UE, an RRC configuration including the configuration for the dedicated resource pool.

Figure 10:
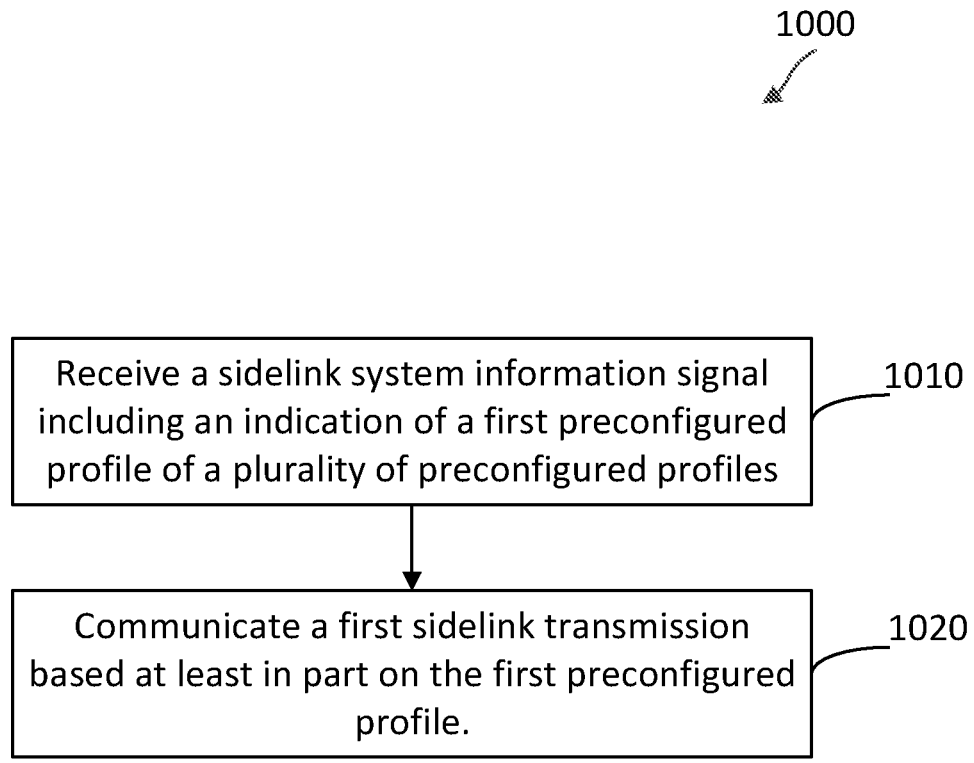
FIG. 10 is a flow diagram of a sidelink communication method according to some aspects of the present disclosure.

FIG. 10 is a flow diagram of a sidelink communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as a UE 115, an S/A UE 206, an S/A UE 606, or a non-controller UE 800, may utilize one or more components, such as the processor 802, the memory 804, the sidelink communication module 808, the transceiver 810, the modem 812, and/or the one or more antennas 816, to execute the steps of method 1000. The method 1000 may employ similar mechanisms as described above in FIGS. 1-6. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a first sidelink UE receives, from a second sidelink UE, a sidelink system information signal including an indication (e.g., the profile indication 412) of a first preconfigured profile of a plurality of preconfigured profiles (e.g., the preconfigured profiles 420). The first sidelink UE may correspond to a UE 115, an S/A UE 206, an S/A UE 604, or a non-controller UE 800. In some instances, the first sidelink UE may utilize one or more components, such as the processor 802, the memory 804, the sidelink communication module 808, the transceiver 810, the modem 812, and/or the one or more antennas 816, to receive the sidelink system information signal including the indication of the first preconfigured profile of the plurality of preconfigured profiles.

In some aspects, as part of receiving the sidelink system information signal, the first sidelink UE may receive, from the second sidelink UE, a PSBCH signal (e.g., the PSBCH signal 410) including an index referencing the first preconfigured profile. In some instances, the first sidelink UE may monitor a certain frequency subchannel for a PSBCH based on a pre-configuration (e.g., a default pre-configuration). In some aspects, as part of receiving the sidelink system information signal, the first sidelink UE may receive, from the second sidelink UE, a PSBCH signal including a zone ID associated with the first preconfigured profile.

At block 1020, the first sidelink UE communicates a first sidelink transmission based at least in part on the first preconfigured profile. The second sidelink UE may correspond to a UE 115, a PLC UE 204, a PLC UE 604, or a controller UE 700. In some instances, the first sidelink UE may utilize one or more components, such as the processor 802, the memory 804, the sidelink communication module 808, the transceiver 810, the modem 812, and/or the one or more antennas 816, to communicate the first sidelink transmission with the second sidelink UE. The first sidelink transmission may include a PSCCH, PSSCH, and/or a PSFCH transmission. In some instances, the first sidelink UE may transmit the first sidelink transmission to the second sidelink UE or a different sidelink UE (e.g., the UEs 115, 204, 206, 604, 606). In some instances, the first sidelink UE may receive the first sidelink transmission from the second sidelink UE or a different sidelink UE.

In some aspects, the first preconfigured profile comprises at least one of a frequency band configuration or a radio resource configuration, for example, as discussed above with reference to FIG. 4. In some aspects, the first preconfigured profile includes the radio resource configuration indicating at least one of a sidelink transmit resource pool or a sidelink receive resource pool. In some aspects, as part of communicating the first sidelink transmission, the first sidelink UE may communicate the first sidelink transmission using a resource (e.g., the sidelink resource 306 of FIG. 3) in the at least one of the sidelink transmit resource pool or the sidelink receive resource pool.

In some aspects, first sidelink UE may further receive, from the second sidelink UE, a sidelink RMSI signal (e.g., the sidelink RMSI signal 520) including an RRM configuration, for example, as discussed above with reference to FIG. 5. In some aspects, the RRM configuration overrides a zone configuration in the first preconfigured profile, the RRM configuration comprising at least one of geographical coordinate information, a zone length, a zone width, or a zone-to-resource pool mapping. In some aspects, the RRM configuration overrides a congestion control configuration in the first preconfigured profile, the RRM configuration comprising at least one of a CBR or a CR associated with a preconfigured resource pool indicated by the first preconfigured profile. In some aspects, the RRM configuration indicates one or more resource pools different from a preconfigured resource pool indicated by the first preconfigured profile. In some aspects, the RRM configuration further indicates a plurality of congestion control parameters for a first resource pool of the one or more resource pools, and wherein each congestion control parameter of the plurality of congestion control parameters is associated with a different QoS. In some aspects, the RRM configuration indicates an exceptional transmit resource pool associated with a first sensing rule different from a second sensing rule associated with a normal transmit resource pool. In some aspects, the first sensing rule allows a random sub-channel selection in the exceptional transmit resource pool without sensing. The sensing may be SCI sensing as discussed above with reference to FIGS. 3 and 5. In some aspects, the exceptional transmit resource pool is in an unlicensed spectrum band, and the first sensing rule indicates a CSMA based LBT for accessing the exceptional transmit resource pool.

The LBT can be based on an energy detection as discussed above with reference to FIG. 1.

In some aspects, the first sidelink UE may further establish, with the second sidelink UE, a unicast connection. The first sidelink UE may also communicate a second sidelink transmission using a first resource in the exceptional transmit resource pool based on the unicast connection. In some aspects, as part of communicating the second sidelink transmission, the first sidelink UE may communicate the second sidelink transmission using the first resource in the exceptional transmit resource pool based on at least one of sensing in the normal transmit resource pool, a priority of the second sidelink transmission, or a duration of the second sidelink transmission. The sensing in the normal transmit resource pool may refer to SCI sensing as discussed above with reference to FIGS. 3 and 5. In some aspects, the first sidelink UE may further receive, from the second sidelink UE, a configuration for a dedicated resource pool for the second sidelink UE. The first sidelink UE may communicate a third sidelink transmission using a second resource in the dedicated resource pool based on the sensing. In some aspects, as part of receiving the configuration for the dedicated resource pool, the first sidelink UE may receive, from the second sidelink UE, an RRC configuration including the configuration for the dedicated resource pool. In some aspects, the first sidelink UE may further perform sensing in the dedicated resource pool. The sensing in the normal transit resource pool may refer to SCI sensing as discussed above with reference to FIGS. 3 and 5. As part of communicating the second sidelink transmission, the first sidelink UE may communicate, before completing the sensing in the dedicated resource pool, the second sidelink transmission using the first resource in the exceptional transmit resource pool. The sensing in the dedicated resource pool may be SCI sensing as discussed above with reference to FIGS. 3 and 5. In some aspects, as part of third sidelink transmission, the first sidelink UE may communicate the third sidelink transmission using the second resource in the dedicated resource pool based on the sensing.

In some aspects, the first sidelink UE may further communicate a second sidelink transmission based on the RRM configuration received in the sidelink RMSI signal. In some aspects, the first sidelink UE may further start a timer (e.g., the timer 602) in response to receiving the sidelink RMSI signal. The second sidelink transmission communicate using the RRM configuration may be based on the timer being in progress, and the first sidelink transmission communicated using the first preconfigured profile may be based on an expiration of the timer. In some aspects, the timer may be started based on the first sidelink UE not having a unicast connection with the second sidelink UE.

In some aspects, the first sidelink UE may synchronize to the second sidelink UE based on the sidelink system information signal. For instance, the UE may adjust a reference timing at the UE to align to a symbol timing (e.g., symbol boundary) of the sidelink information signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), comprising:
    transmitting a sidelink system information signal including an indication of a first preconfigured profile of a plurality of preconfigured profiles;
    communicating, with a second UE, a first sidelink transmission based at least in part on the first preconfigured profile; and
    transmitting a sidelink remaining minimum system information (RMSI) signal including a radio resource management (RRM) configuration, wherein the RRM configuration indicates: one or more resource pools different from a preconfigured resource pool indicated by the first preconfigured profile; and a plurality of congestion control parameters for a first resource pool of the one or more resource pools, and wherein each congestion control parameter of the plurality of congestion control parameters is associated with a different quality of service (Qos).

2. The method of claim 1, wherein the transmitting the sidelink system information signal comprises:
    transmitting a physical sidelink broadcast channel (PSBCH) signal including an index referencing the first preconfigured profile.

3. The method of claim 1, wherein the transmitting the sidelink system information signal comprises:
transmitting a physical sidelink broadcast channel (PSBCH) including a zone identifier (ID) identifying the first preconfigured profile.

4. The method of claim 1, wherein the first preconfigured profile comprises a radio resource configuration indicating at least one of a sidelink transmit resource pool or a sidelink receive resource pool, and wherein the communicating the first sidelink transmission comprises: communicating the first sidelink transmission using a resource in the at least one of the sidelink transmit resource pool or the sidelink receive resource pool.

5. The method of claim 1, wherein the RRM configuration indicates an exceptional transmit resource pool associated with a first sensing rule different from a second sensing rule associated with a normal transmit resource pool.

6. The method of claim 1, further comprising:
transmitting a synchronization signal to provide a reference synchronization source for one or more UEs including the second UE.

7. The method of claim 1, further comprising:
establishing, with the second UE, a unicast connection; and
transmitting, to the second UE, a configuration for a dedicated resource pool for the second UE based on the unicast connection, wherein the transmitting the configuration for the dedicated resource pool comprises: transmitting, to the second UE, a sidelink radio resource control (RRC) configuration including the configuration for the dedicated resource pool.

8. A method of wireless communication performed by a first user equipment (UE), comprising:
receiving, from a second UE, a sidelink system information signal including an indication of a first preconfigured profile of a plurality of preconfigured profiles; and
communicating a first sidelink transmission based at least in part on the first preconfigured profile; and
receiving, from the second UE, a sidelink remaining minimum system information (RMSI) signal including a radio resource management (RRM) configuration, wherein the RRM configuration indicates: one or more resource pools different from a preconfigured resource pool indicated by the first preconfigured profile; and a plurality of congestion control parameters for a first resource pool of the one or more resource pools, and wherein each congestion control parameter of the plurality of congestion control parameters is associated with a different quality of service (Qos).

9. The method of claim 8, wherein the receiving the sidelink system information signal comprises:
receiving, from the second UE, a physical sidelink broadcast channel (PSBCH) signal including an index referencing the first preconfigured profile.

10. The method of claim 8, wherein the receiving the sidelink system information signal comprises:
receiving, from the second UE, a physical sidelink broadcast channel (PSBCH) including a zone identifier (ID) associated with the first preconfigured profile.

11. The method of claim 8, wherein the first preconfigured profile comprises a radio resource configuration indicating at least one of a sidelink transmit resource pool or a sidelink receive resource pool, and wherein the communicating the first sidelink transmission comprises: communicating the first sidelink transmission using a resource in the at least one of the sidelink transmit resource pool or the sidelink receive resource pool.

12. The method of claim 8, wherein the RRM configuration indicates an exceptional transmit resource pool associated with a first sensing rule different from a second sensing rule associated with a normal transmit resource pool.

13. The method of claim 12, further comprising:
establishing, with the second UE, a unicast connection; and
communicating a second sidelink transmission using a first resource in the exceptional transmit resource pool based on the unicast connection and at least one of sensing in the normal transmit resource pool, a priority of the second sidelink transmission, or a duration of the second sidelink transmission.

14. The method of claim 13, further comprising:
receiving, from the second UE, a configuration for a dedicated resource pool for the second UE; and communicating a third sidelink transmission using a second resource in the dedicated resource pool based on the sensing.

15. The method of claim 8, further comprising:
communicating a second sidelink transmission based on the RRM configuration.

16. A first user equipment (UE) comprising:
means for transmitting a sidelink system information signal including an indication of a first preconfigured profile of a plurality of preconfigured profiles; and
means for communicating, with a second UE, a first sidelink transmission based at least in part on the first preconfigured profile; and
means for transmitting a sidelink remaining minimum system information (RMSI) signal including a radio resource management (RRM) configuration,
wherein the RRM configuration indicates:
one or more resource pools different from a preconfigured resource pool indicated by the first preconfigured profile; and a plurality of congestion control parameters for a first resource pool of the one or more resource pools, and
wherein each congestion control parameter of the plurality of congestion control parameters is associated with a different quality of service (Qos).

17. The first UE of claim 16, wherein the means for transmitting the sidelink system information signal is further configured to: transmit a physical sidelink broadcast channel (PSBCH) signal including an index referencing the first preconfigured profile.

18. The first UE of claim 16, wherein the means for transmitting the sidelink system information signal is further configured to: transmit a physical sidelink broadcast channel (PSBCH) including a zone identifier (ID) identifying the first preconfigured profile.

19. The first UE of claim 16, wherein the first preconfigured profile comprises a radio resource configuration indicating at least one of a sidelink transmit resource pool or a sidelink receive resource pool, and wherein the means for communicating the first sidelink transmission is further configured to: communicate the first sidelink transmission using a resource in the at least one of the sidelink transmit resource pool or the sidelink receive resource pool.

20. The first UE of claim 16, wherein the RRM configuration indicates an exceptional transmit resource pool associated with a first sensing rule different from a second sensing rule associated with a normal transmit resource pool.

21. The first UE of claim 16, further comprising:
means for transmitting a synchronization signal to provide a reference synchronization source for one or more UEs including the second UE.

22. The first UE of claim 16, further comprising:
means for establishing, with the second UE, a unicast connection; and
means for transmitting, to the second UE, a configuration for a dedicated resource pool for the second UE based on the unicast connection, wherein the means for transmitting the configuration for the dedicated resource pool is further configured to: transmit, to the second UE, a sidelink radio resource control (RRC) configuration including the configuration for the dedicated resource pool.

23. A first user equipment (UE) comprising:
means for receiving, from a second UE, a sidelink system information signal including an indication of a first preconfigured profile of a plurality of preconfigured profiles;
means for communicating a first sidelink transmission based at least in part on the first preconfigured profile; and
means for receiving, from the second UE, a sidelink remaining minimum system information (RMSI) signal including a radio resource management (RRM) configuration, wherein the RRM configuration indicates: one or more resource pools different from a preconfigured resource pool indicated by the first preconfigured profile; and a plurality of congestion control parameters for a first resource pool of the one or more resource pools, and wherein each congestion control parameter of the plurality of congestion control parameters is associated with a different quality of service (Qos).

24. The first UE of claim 23, wherein the means for receiving the sidelink system information signal is further configured to: receive, from the second UE, a physical sidelink broadcast channel (PSBCH) signal including an index referencing the first preconfigured profile.

25. The first UE of claim 23, wherein the means for receiving the sidelink system information signal is further configured to: receive, from the second UE, a physical sidelink broadcast channel (PSBCH) including a zone identifier (ID) associated with the first preconfigured profile.

26. The first UE of claim 23, wherein the first preconfigured profile a radio resource configuration indicating at least one of a sidelink transmit resource pool or a sidelink receive resource pool, and wherein the means for communicating the first sidelink transmission is further configured to: communicate the first sidelink transmission using a resource in the at least one of the sidelink transmit resource pool or the sidelink receive resource pool.

27. The first UE of claim 23, wherein the RRM configuration indicates an exceptional transmit resource pool associated with a first sensing rule different from a second sensing rule associated with a normal transmit resource pool.

28. The first UE of claim 27, further comprising:
means for establishing, with the second UE, a unicast connection; and
means for communicating a second sidelink transmission using a first resource in the exceptional transmit resource pool based on the unicast connection and at least one of sensing in the normal transmit resource pool, a priority of the second sidelink transmission, or a duration of the second sidelink transmission.

29. The first UE of claim 28, further comprising:
means for receiving, from the second UE, a configuration for a dedicated resource pool for the second UE; and
means for communicating a third sidelink transmission using a second resource in the dedicated resource pool based on the sensing.

30. The first UE of claim 23, further comprising:
means for communicating a second sidelink transmission based on the RRM configuration.

* * * * *